United States Patent
Otsuka et al.

(10) Patent No.: US 9,379,399 B2
(45) Date of Patent: Jun. 28, 2016

(54) SOLID OXIDE FUEL CELL SYSTEM

(75) Inventors: Toshiharu Otsuka, Nakama (JP);
Katsuhisa Tsuchiya, Chigasaki (JP);
Tsukasa Shigezumi, Nishinomiya (JP);
Toshiharu Ooe, Chigasaki (JP);
Kiyotaka Nakano, Narashino (JP);
Takuya Matsuo, Yokohama (JP)

(73) Assignee: TOTO LTD., Fukuoka (JP)

( * ) Notice: Subject to any disclaimer, the term of this patent is extended or adjusted under 35 U.S.C. 154(b) by 198 days.

(21) Appl. No.: 14/347,983

(22) PCT Filed: Sep. 29, 2011

(86) PCT No.: PCT/JP2011/072400
§ 371 (c)(1),
(2), (4) Date: Mar. 27, 2014

(87) PCT Pub. No.: WO2013/046395
PCT Pub. Date: Apr. 4, 2013

(65) Prior Publication Data
US 2014/0242489 A1    Aug. 28, 2014

(51) Int. Cl.
*H01M 8/04* (2016.01)
*H01M 8/24* (2016.01)
*H01M 8/12* (2016.01)

(52) U.S. Cl.
CPC ........ *H01M 8/04902* (2013.01); *H01M 8/0491* (2013.01); *H01M 8/04626* (2013.01); *H01M 8/04753* (2013.01); *H01M 8/243* (2013.01); *H01M 2008/1293* (2013.01); *Y02E 60/50* (2013.01); *Y02E 60/525* (2013.01)

(58) Field of Classification Search
CPC ...... H01M 8/04298; H01M 8/04537–8/04656; H01M 8/04828–8/04947
See application file for complete search history.

(56) References Cited

U.S. PATENT DOCUMENTS

| | | | | |
|---|---|---|---|---|
| 2011/0190959 A1* | 8/2011 | Manabe | ............ | H01M 8/0488 700/298 |
| 2013/0209903 A1* | 8/2013 | Otsuka | ............ | H01M 8/04052 429/416 |

FOREIGN PATENT DOCUMENTS

| JP | 07-307163 A | 11/1995 |
|---|---|---|
| JP | 9-270265 A | 10/1997 |

(Continued)

OTHER PUBLICATIONS

Machine English translation of JP 2004-063180 A.*

(Continued)

*Primary Examiner* — Ula C Ruddock
*Assistant Examiner* — Scott J Chmielecki
(74) *Attorney, Agent, or Firm* — Brinks Gilson & Lione

(57) ABSTRACT

To provide a solid oxide fuel cell system capable of efficiently and simply controlling a low speed fuel cell module and a high speed inverter. The invention is a solid oxide fuel cell system, comprising: a fuel cell module, a fuel flow regulator unit, a control section comprising a first power demand detection circuit for controlling the fuel supply amount and for setting the value of current extractable from the fuel cell module; an inverter for extracting current from fuel cell module; and a second power demand detection circuit; and having an inverter control section for controlling the inverter independently from the fuel cell controller so that a current responsive to power demand is extracted from the fuel cell module in a range not exceeding the extractable current value input from the fuel cell controller.

9 Claims, 14 Drawing Sheets

(56) References Cited

FOREIGN PATENT DOCUMENTS

| | | | |
|---|---|---|---|
| JP | 2000-348748 A | | 12/2000 |
| JP | 2004-063180 A | | 2/2004 |
| JP | 2004-063368 A | | 2/2004 |
| JP | 2004063180 A | * | 2/2004 |
| JP | 2004-265683 A | | 9/2004 |
| JP | 2007-294443 A | | 11/2007 |
| JP | 2008-17598 A | | 1/2008 |
| JP | 2008-84715 A | | 4/2008 |
| JP | 2010-62032 A | | 3/2010 |
| JP | 2011-76941 A | | 4/2011 |
| WO | WO 2008/004564 A1 | | 1/2008 |

OTHER PUBLICATIONS

International Search Report for International Application No. PCT/JP2011/072400, dated Dec. 20, 2011, 2 pages.
Written Opinion of the International Searching Authority for International Application No. PCT/JP2011/072400, dated Dec. 20, 2011, 7 pages.
International Preliminary Report on Patentability for International Application No. PCT/JP2011/072400, dated Apr. 1, 2014, 8 pages.

* cited by examiner

FIG.9

| No. | TRANSITION CONDITION ||||||| STATE PROCESS ||
|---|---|---|---|---|---|---|---|---|
| | GENERATING CHAMBER TEMP. Tfc | GENERATING VOLTAGE Vdc | GRID POWER Wl | INTERCONNECT POWER Winv | EXTRACTABLE CURRENT VALUE Iinv | FUEL SUPPLY CURRENT VALUE If | STATE PROCESS | EXTRACTABLE CURRENT VALUE |
| 1 | — | — | — | — | (Iinv−ACTUAL EXTRACTED CURRENT)≧[400mA] AND Iinv>[1A] | — | DECREASE Iinv | Iinv = Iinv−5mA, BUT 1A IF VALUE FALLS BELOW 1A |
| 2 | GENERATING TEMP. >[850°C] | — | — | — | Iinv>[1A] | — | DECREASE Iinv | Iinv = Iinv−5mA, BUT 1A IF VALUE FALLS BELOW 1A |
| 3 | GENERATING TEMP. <[550°C] | — | — | — | Iinv>[1A] | — | DECREASE Iinv | Iinv = Iinv−5mA, BUT 1A IF VALUE FALLS BELOW 1A |
| 4 | — | GENERATING VOLTAGE <[95V] | — | — | Iinv>[1A] | — | DECREASE Iinv | Iinv = Iinv−10mA, BUT 1A IF VALUE FALLS BELOW 1A |
| 5 | — | — | — | INTERCONNECT POWER >[710W] | Iinv>[1A] | — | DECREASE Iinv | Iinv = Iinv−5mA, BUT 1A IF VALUE FALLS BELOW 1A |
| 6 | — | — | GRID POWER <[50W] | — | (Iinv−ACTUAL EXTRACTED CURRENT)>[1000mA] | — | IMMEDIATELY DROP Iinv | Iinv = ACTUAL EXTRACTED CURRENT |
| 7 | — | — | GRID POWER >[40W] | INTERCONNECT POWER ≦[690W] | (Iinv−ACTUAL EXTRACTED CURRENT)≦[300mA] | FUEL SUPPLY CURRENT VALUE − ACTUAL EXTRACTED CURRENT≧[1000mA] | INCREASE Iinv (FAST RISE) | Iinv = Iinv+100mA |
| 8 | GENERATING TEMP. ≧[600°C] | GENERATING VOLTAGE ≧[100V] | — | — | — | — | INCREASE Iinv (NORMAL RISE) | Iinv = Iinv+10mA |
| 9 | OTHER THAN ABOVE ||||||| Iinv NO CHANGE | Iinv = Iinv |

※CONTROL CYCLE : 500msec

SOLID OXIDE FUEL CELL SYSTEM

This application is a 371 application of PCT/JP2011/072400 having an international filing date of Sep. 29, 2011, the entire content of which is incorporated herein by reference.

TECHNICAL FIELD

The present invention pertains to a solid oxide fuel cell system, and more particularly to a solid oxide fuel cell system for generating variable electrical power in response to power demand.

BACKGROUND ART

In recent years, various solid oxide fuel devices comprising fuel cells capable of obtaining electrical power by generating electricity using fuel (hydrogen gas) and air, as well as auxiliary equipment for running such fuel cells, have been proposed as next-generation energy sources.

Japanese Unexamined Patent Application H. 7-307163 (Patent Document 1) sets forth a fuel cell device. In this fuel cell device, the electrical power generated is varied in response to load.

Here, referring to FIG. 15, we explain a power supply system utilizing a fuel cell. FIG. 15 shows an example of a conventional system for supplying electrical power to a residence using a fuel cell. In the system, electrical power consumed by a residence 200 is supplied by fuel cell 202 and grid power 204. Normally the maximum consumed power consumed by residences is larger than the maximum rated power generatable by fuel cell 202, therefore even in a residence 200 utilizing a fuel cell 202, that insufficiency is made up for by grid power 204, and electrical power is supplied to the residence from fuel cell 202 and grid power 204. Furthermore, even in situations where the generating capacity of fuel cell 202 is below the maximum rated power for a residence, a portion of the electrical power consumption of residence 200 is normally supplied from the grid power 204 in order to prevent reverse current flow of generated power to current power 204.

Grid power 204 is power fed from a transmission line to an electrical distribution panel inside a residence, and is purchased power. In other words, the total of the electrical power generated by fuel cell 202 and grid power 204 corresponds to the power consumed by residence 200. Fuel cell 202 obtains a monitor signal from power demand detector 206 of the electrical power purchased by residence 200, and based on this it varies the power generated by fuel cell 202. I.e., fuel cell 202 determines a base current Ii expressing the current which fuel cell 202 should produce based on the monitor signal obtained from power demand detector 206, and controls the amount of fuel, etc. supplied to fuel cell module 208 to enable production of this base current Ii. Also, base current Ii is set at or below a value corresponding to the maximum rated power of fuel cell 202, regardless of the power consumed by residence 200.

The fuel cell module 208 built into fuel cell 202 generally has an extremely slow response, making it difficult to change generated power to follow changes in power consumed by residence 200. Therefore the base current Ii signal which instructs an electrical generation amount to fuel cell module 208 is determined by applying a filter 210 which performs integration or the like on the monitor signal, so that it changes extremely gradually compared to the change in power consumption.

Fuel cell 202 supplies fuel cell module 208 with an amount of fuel proportional to base current Ii so that fuel cell module 208 has the capacity to produce the base current Ii. At the same time, inverter 212 extracts a DC extracted current Ic from fuel cell module 208 and converts this to AC and supplies it to residence 200. The actual extracted current Ic which inverter 212 extracts from fuel cell module 208 is at all times set at or below the value of base current Ii, and does not exceed the generating capacity of fuel cell module 208. If a current equal to or greater than the generating capacity corresponding to the fuel supply amount, etc. determined based on base current Ii is extracted from fuel cell module 208, then there is a risk that fuel depletion in fuel cells within the fuel cell module 208 will occur, dramatically shortening the life span of the fuel cells and damaging the fuel cells.

At the same time, because of sharp fluctuations in the power consumed by residence 200, when consumed power suddenly drops, the residence 200 power consumption drops further than the power corresponding to base current Ii, which is slowly varied.

In the fuel cell generating apparatus set forth in Japanese Published Unexamined Patent Application H.07-307163, an inverter required to respond to suddenly fluctuating power consumption and a fuel cell module incapable of following sudden changes in generated power are controlled by a single control means.

Japanese Unexamined Patent Application H7-307163

SUMMARY OF THE INVENTION

Problems the Invention Seeks to Resolve

However, the fuel cell generating apparatus set forth in Japanese Published Unexamined Patent Application H.07-307163 is unable to respond to sudden changes, and because the fuel cell module, which does not require high speed control, is controlled by the same control means as the inverter, which does require high speed control in order to prevent reverse power flow, the fuel cell module is controlled by a control means equipped with excessive capability. Therefore in conventional fuel cell generating apparatuses, the problem arises that information processing capacity is wasted.

Moreover, in conventional fuel cell generating apparatuses, because a low speed response fuel cell module control is combined with a high speed response inverter control in a single control means, the problem arises that the control algorithm is made complicated.

In addition, in conventional fuel cell generating apparatuses, because fuel cell module control and inverter control are executed by a single control means, changes to the design specifications, etc. of either the fuel cell module or the inverter require redesign of the entire control algorithm in the control means, leading to the problem of extended time required for design changes.

Therefore the invention has the object of providing a solid oxide fuel cell system capable of efficiently and simply controlling a fuel cell module not requiring high speed control, and an inverter requiring high speed control.

Means for Resolving Problems

To solve the above-described problems, the present invention is a solid oxide fuel cell system for generating variable power in response to power demand, comprising: a fuel cell module that generates electricity using supplied fuel; a fuel supply device that supplies fuel to the fuel cell module; a fuel cell controller including a first power demand detection circuit that detects power demand, that controls the fuel supply amount by the fuel supply device based on the power demand detected by the first power demand detection circuit, and that sets an extractable current value, being the maximum current value extractable from the fuel cell module in response to the state of the fuel cell module; n inverter that extracts current from the fuel cell module and converting it to alternating current; and an inverter controller including a second power demand detection circuit that detects power demand; wherein the inverter controller controls the inverter independently from the fuel cell controller so that in a range within not exceeding the extractable current value input from the fuel cell controller, a current responsive to the power demand detected by the second power demand detection circuit is extracted from the fuel cell module.

In the invention thus constituted, the controller controls the amount of fuel supplied by a fuel supplying means based on a power demand detected by a first power demand detection circuit to provide fuel to a fuel cell module. In addition, the fuel cell controller sets the extractable current value, which is the maximum current value extractable from the fuel cell module according to the state of the fuel cell module, and outputs this value to the inverter controller. The inverter controller controls the inverter independently from the fuel cell controller. The inverter controller also controls the inverter so that a current responding to the power demand detected by the second power demand detection circuit is extracted from the fuel cell module in a range not exceeding the extractable current value.

In general, the inverter needs to be controlled with high responsiveness so that it can extract current needed from the fuel cell module in response to suddenly changing power demands. At the same time, if the fuel supply amount supplied the fuel cell module is suddenly changed, it can occur that electrical generation by the fuel cell module becomes unstable, or the fuel cell module temperature suddenly drops so that sufficient power cannot be generated until the temperature recovers, therefore highly responsive control cannot be performed. By thus implementing controls of differing responsiveness using a single controller, the control algorithm does become more complicated, but using this invention the fuel cell controller and the inverter controller are independent, respectively controlling the fuel supply device and the inverter, so the control itself is not further complicated. The inverter controller can control the inverter independently of the fuel cell controller based on the power demand detected by the second power demand detection circuit, and on the extractable current value input from the fuel cell controller. Therefore changes in fuel cell module specification, etc. can be handled by simply changing the control executed by the fuel cell controller, and changes in inverter specification can be handled simply by changing the control executed by the inverter controller. The versatility of the fuel cell controller and the inverter controller can thus be improved.

Therefore the fuel cell module which does not require high speed control, and the inverter which does require high speed control, can be efficiently and easily controlled.

In the invention, the fuel cell controller preferably further comprises an extracted current detection circuit that detects current actually extracted from the fuel cell module, and the extractable current value is reduced based on the difference between the actual extracted current value detected by the extracted current detection circuit, and the extractable current value.

In the invention, current is extracted from the fuel cell module within a range not exceeding the extractable current value. Since fuel is supplied to the fuel cell module in response to the extractable current value, there can be a difference between the actual extracted current value actually extracted from the fuel cell module and the extractable current value, due to differences between fuel cell and inverter control response sensitivity, and when the actual extracted current value is far less than the extractable current value, unnecessary fuel is supplied. In the invention thus constituted, the extractable current value is reduced based on the difference between the extractable current value and the actual extracted current value actually extracted, therefore wasteful supplying of fuel can be suppressed and some degree of difference between the actual extracted current value and the extractable current value can be tolerated, thereby enabling electrical generation by the fuel cell module to be matched rapidly to increases in extracted current.

In the invention, the fuel cell controller preferably controls the fuel supply device so that when the extractable current value has been reduced, the fuel supply amount is reduced at a greater delay than this reduction in the extractable current value.

In the invention, control of the fuel cell controller and the inverter controller are independently carried out, and the inverter controller can freely extract current from the fuel cell module in a range not exceeding the extractable current value. Therefore if even a tiny offset arises between the fuel cell controller control and the inverter controller control, there is a risk that excessive current will be extracted from the fuel cell module in response to fuel supplied to the fuel cell module. In the invention thus constituted, the fuel supply device is controlled so that the fuel supply amount is reduced at a greater delay than the reduction in the extractable current value, therefore even if there is an offset between the fuel cell controller control and the inverter controller control, damage to the fuel cell module by extraction of excessive current can be avoided.

In the invention, in cases where the extractable current value is raised the fuel cell controller preferably raises the extractable current value at a predetermined first current rise rate of change, and suddenly reduces the extractable current value down to a current value detected by an extracted current detection circuit in response to predetermined condition, while in cases where power demand has risen immediately following a sudden reduction of the extractable current value, the fuel cell controller raises the extractable current value at a second current rise rate of change which is greater than a first current rise rate of change.

In the invention thus constituted, the extractable current value is suddenly reduced down to a current value detected by an extracted current detection circuit in response to predetermined condition, therefore when power demand again starts to rise, the current extracted from the fuel cell module substantially follows the extractable current value and is dominated by the fuel cell controller, notwithstanding that it is controlled independently from the fuel cell controller.

Moreover, in cases when the extractable current value is suddenly reduced, the fuel supply amount reduced after a delay is in an excess state, but in cases where power demand rises immediately after a sudden drop, the extractable current value is raised at a high rate of change, therefore extracted current can be rapidly raised without making unreasonable demands of the fuel cell module.

Effect of the Invention

Using the solid oxide fuel cell system of the invention, the fuel cell module, which does not require high speed control, and the inverter, which does require high speed control, can be efficiently and easily controlled.

BRIEF DESCRIPTION OF THE DRAWINGS

FIG. 9: A control table of the startup processing procedure in a fuel cell system according to an embodiment of the present invention.

DETAILED DESCRIPTION OF THE PREFERRED EMBODIMENTS

Next, referring to the attached drawings, we discuss a solid oxide fuel cell system (SOFC) according to an embodiment of the present invention.

Figure 1:
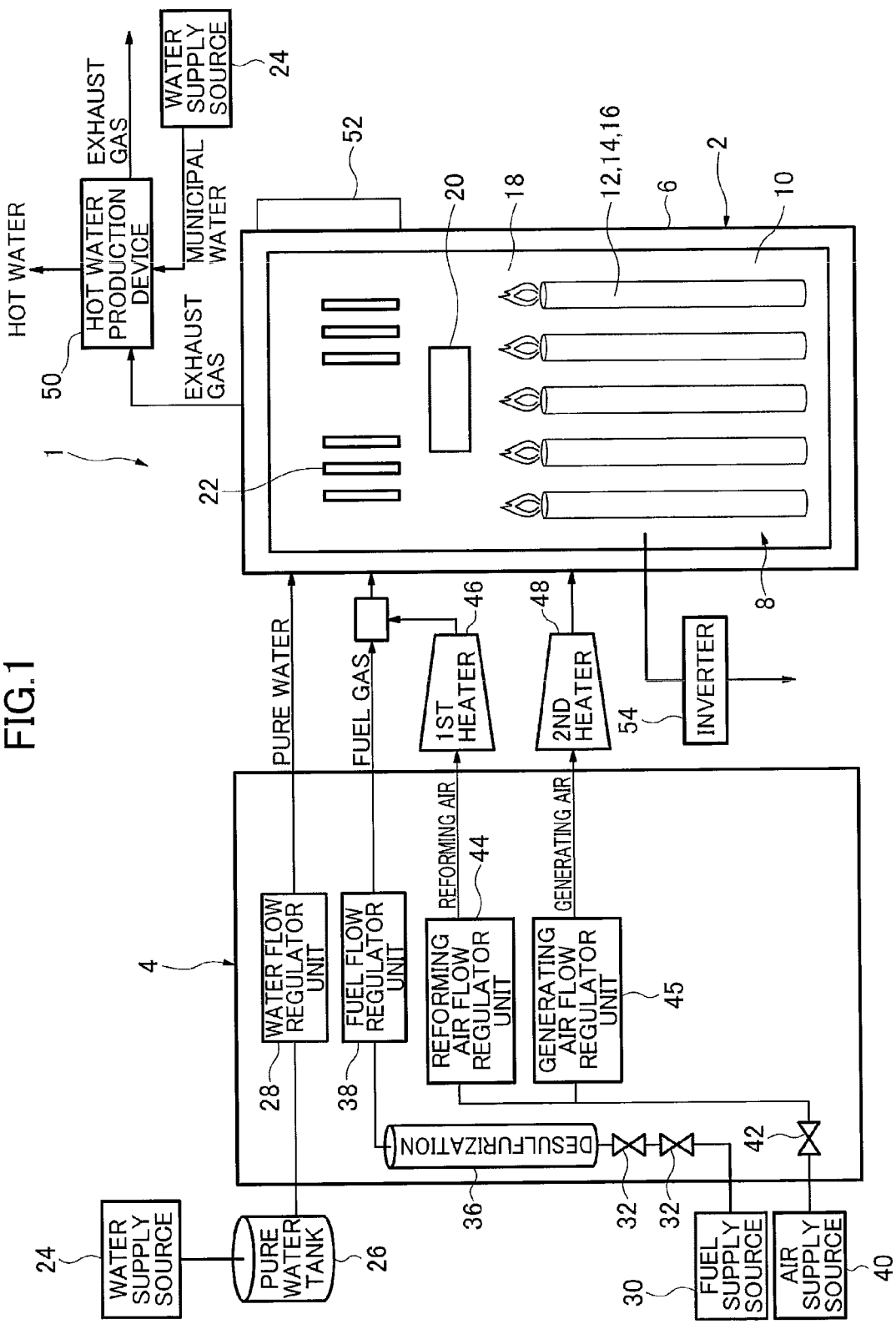
FIG. 1: An overview diagram showing a solid oxide fuel cell system according to an embodiment of the present invention.

FIG. 1 is an overview schematic showing a solid oxide fuel cell system (SOFC) according to an embodiment of the present invention. As shown in FIG. 1, solid oxide fuel cell system (SOFC) 1 according to an embodiment of the present invention comprises a fuel cell module 2 and an auxiliary unit 4.

Fuel cell module 2 comprises a housing 6; inside this housing 6, a sealed space 8 is formed, mediated by thermal insulation (not shown; thermal insulation is not an essential structure, and be can be omitted). Note that it is acceptable not to provide thermal insulation. Fuel cell assembly 12, which performs an electricity generating reaction using fuel gas and oxidant (air), is disposed on generating chamber 10, under this sealed space 8. This fuel cell assembly 12 comprises ten fuel cell stacks 14 (see FIG. 5); fuel cell stacks 14 comprise 16 individual fuel cell units 16 (see FIG. 4). Thus fuel cell assembly 12 has 160 individual fuel cell units 16, and all of these individual fuel cell units 16 are connected in series.

A combustion chamber 18 is formed above the aforementioned generating chamber 10 in fuel cell module 2 sealed space 8; residual fuel gas and residual oxidizer (air) not used in the electricity generating reaction are burned in this combustion chamber 18, producing exhaust gas.

Reformer 20 for reforming fuel gas is disposed above this combustion chamber 18; reformer 20 is heated to a temperature at which the reforming reaction can occur by the combustion heat of the residual gas. Furthermore, air heat exchanger 22 for receiving heat from reformer 20 and heating air to suppress temperature drops in reformer 20 is disposed above reformer 20.

Next, auxiliary unit 4 comprises pure water tank 26, which stores water from water supply source 24 and uses a filter to produce pure water, and water flow volume regulator unit 28 (a motor-driven "water pump" or the like), which regulates the flow volume of water supplied from this holding tank. Auxiliary unit 4 comprises gas shutoff valve 32 for shutting off fuel gas such as municipal gas supplied from fuel supply source 30, desulfurizer 32 for removing sulfur from fuel gas, and fuel flow regulator unit 38 (a motor-driven "water pump" or the like) for regulating the flow volume of fuel gas. Furthermore, auxiliary unit 4 comprises: an electromagnetic valve 42 for shutting off air, which is the oxidant supplied from air supply source 40, reform air flow regulator unit 44 and generating air flow regulator unit 45 (a motor-driven "water pump" or the like), which regulate the flow volume air, first heater 46 for heating reforming air supplied to reformer 20, and second heater 48 for heating air supplied to the electrical generating chamber. This first heater 46 and second heater 48 are provided in order to efficiently raise the temperature at startup, but may also be omitted.

Next, a hot water production device 50, supplied with exhaust gas, is connected to fuel cell module 2. Tap water is supplied from water supply source 24 to this hot water production device 50; this tap water becomes hot water using the heat of the exhaust gas, and is supplied to an external hot water holding tank, not shown.

A control box 52 for controlling the amount of fuel gas supplied, etc. is connected to the fuel cell module 2.

Furthermore, an inverter 54 serving as an electrical power extraction unit (power conversion unit) for supplying electrical power generated by the fuel cell module to the outside is connected to fuel cell module 2.

Figure 2:
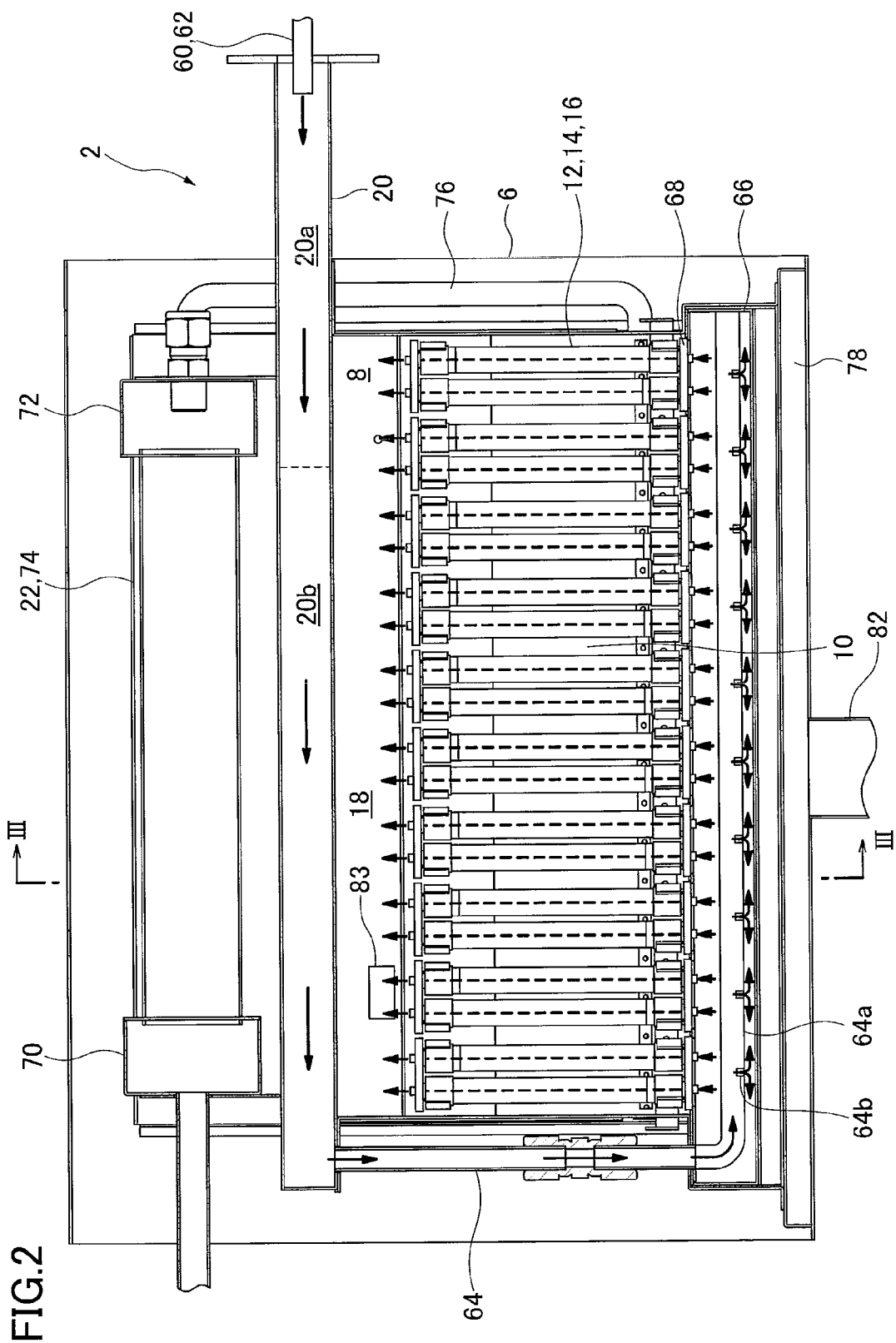
FIG. 2: A front elevation cross section showing the fuel cell module in a fuel cell system according to an embodiment of the present invention.
Figure 3:
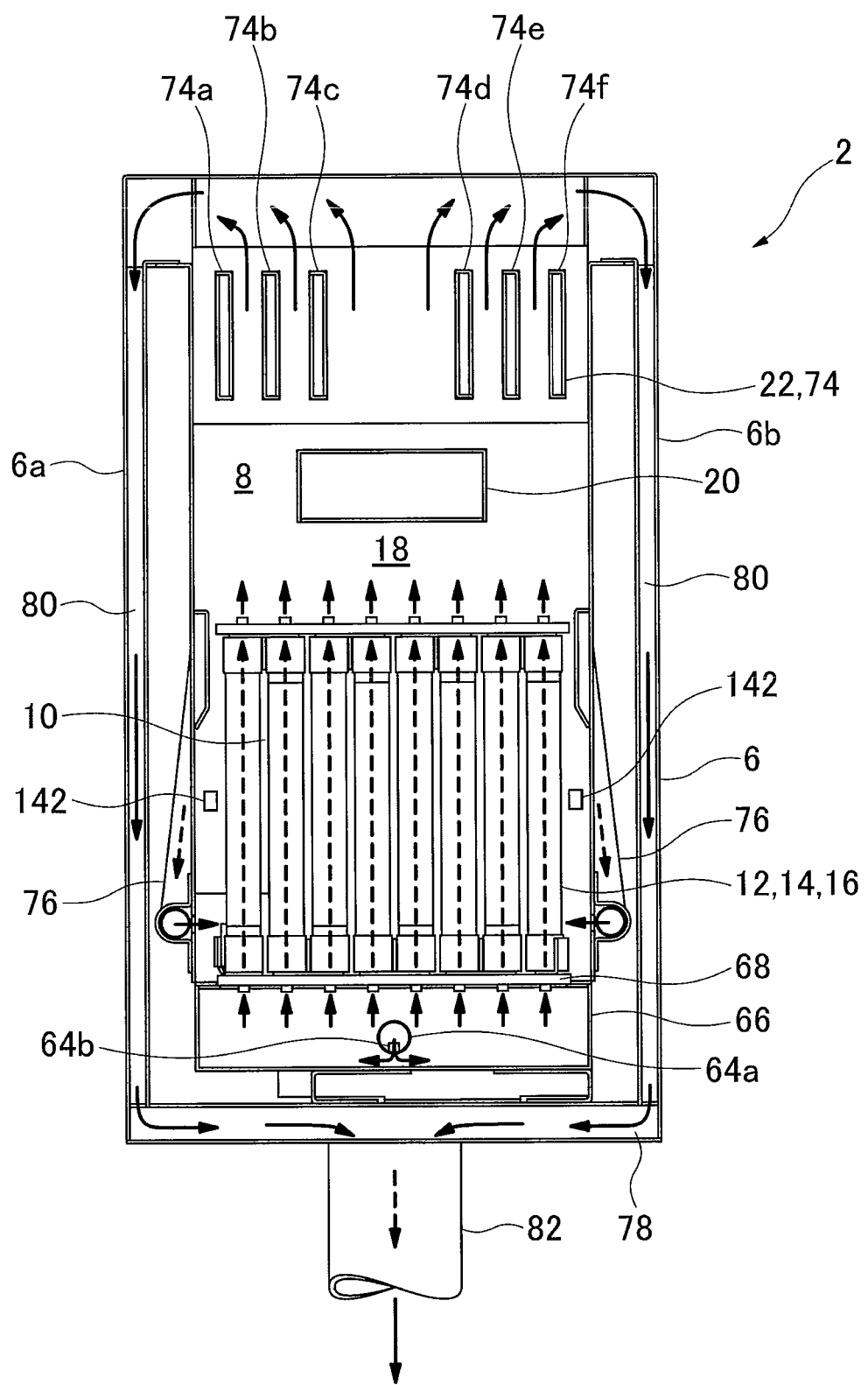
FIG. 3: A cross section along line III-III in FIG. 2.

Next, using FIGS. 2 and 3, we explain the internal structure of a solid oxide fuel cell system (SOFC) according to the present embodiment of the invention. FIG. 2 is a side view cross section showing the fuel cell module in a solid oxide fuel cell system (SOFC) according to an embodiment of the invention; FIG. 3 is a cross section along III-III line of FIG. 2.

As shown in FIGS. 2 and 3, starting from the bottom in the sealed space 8 within the fuel cell module 2 housing 6, a fuel cell assembly 12, a reformer 20, and an air heat exchanger 22 are arranged in sequence, as described above.

A pure water guide pipe 60 for introducing pure water into the upstream end of reformer 20, and a reform gas guide pipe 62 for introducing fuel gas and reforming air to be reformed, are attached to reformer 20; a vaporizing section 20a and a reforming section 20b are formed in sequence starting from the upstream side within reformer 20, and these reforming sections 20a and 20b are filled with reforming catalyst. Fuel gas and air, blended with steam (pure water) introduced into reformer 20, is reformed using the reforming catalyst with which reformer 20 is filled. Reforming catalysts in which nickel is applied to the surface of aluminum spheres, or ruthenium is imparted to the surface of aluminum spheres, are used as appropriate.

A fuel gas supply line 64 is connected to the downstream end of reformer 20; this fuel gas supply line 64 extends downward, then further extends horizontally within a manifold formed under fuel cell assembly 12. Multiple fuel supply holes 64b are formed on the bottom surface of the horizontal portion 64a of fuel gas supply line 64; reformed fuel gas is supplied into manifold 66 from these fuel supply holes 64b.

A lower support plate 68 provided with through holes for supporting the above-described fuel cell stack 14 is attached at the top of manifold 66, and fuel gas in manifold 66 is supplied into fuel cell units 16.

Next, air heat exchanger 22 is provided above reformer 20. This air heat exchanger 22 comprises an air concentration chamber 70 on the upstream side and two air distribution chambers 72 on the downstream side; this air concentration chamber 70 and distribution chambers 72 are connected using six air flow conduits 74. Here, as shown in FIG. 3, three air flow conduits 74 form a set (74a, 74b, 74c, 74d, 74e, 74f); air in air concentration chamber 70 flows from each set of air flow conduits 74 to the respective air distribution chambers 72.

Air flowing in the six air flow conduits 74 of the air heat exchanger 22 is pre-heated by exhaust gas rising after combustion in combustion chamber 18.

Air guide pipes 76 are connected to each of the respective air distribution chambers 72; these air guide pipes 76 extend downward, communicating at the bottom end side with the lower space in generating chamber 10, and introducing pre-heated air into generating chamber 10.

Next, an exhaust gas chamber 78 is formed below manifold 66. As shown in FIG. 3, a vertically extending exhaust gas conduit 80 is formed on the inside of front surface 6a and rear surface 6b, which are faces in the longitudinal direction of housing 6; the top end of exhaust gas chamber conduit 80 communicates with the space where air heat exchanger 22 is disposed, and the bottom end communicates with exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water production device 50 shown in FIG. 1.

As shown in FIG. 2, an ignition device 83 for starting the combustion of fuel gas and air is disposed on combustion chamber 18.

Figure 4:
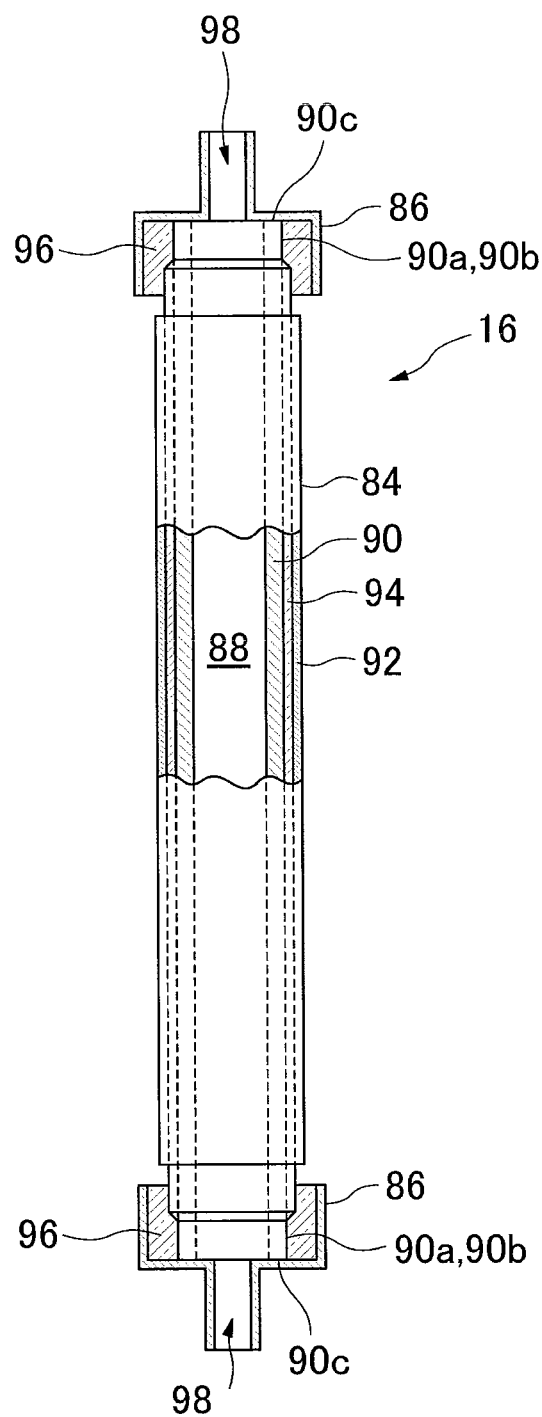
FIG. 4: A partial cross section showing an individual fuel cell unit in a fuel cell system according to an embodiment of the present invention.

Next, referring to FIG. 4, we explain fuel cell units 16. FIG. 4 is a partial cross section showing the fuel cell units of the solid oxide fuel cell system (SOFC) according to an embodiment of the invention.

As shown in FIG. 4, fuel cell units 16 are furnished with a fuel cell 84 and internal electrode terminals 86, respectively connected to the terminals at the top and bottom of fuel cell 84.

Fuel cell 84 is a tubular structure extending in the vertical direction, furnished with a cylindrical internal electrode layer 90, on the inside of which are formed a fuel gas flow path 88, a cylindrical external electrode layer 92, and an electrolyte layer 94 between internal electrode layer 90 and external electrode layer 92. This internal electrode layer 90 is a fuel electrode through which fuel gas passes, and has a (−) polarity, while the external electrode layer 92 is an air-contacting electrode with a (+) polarity.

The internal electrode terminals 86 attached at the top and bottom ends of fuel cell units 16 have the same structure, therefore we here specifically discuss internal electrode terminal 86 attached at the top end. The top portion 90a of inside electrode layer 90 comprises an outside perimeter surface 90b and top end surface 90c, exposed to electrolyte layer 94 and outside electrode layer 92. Inside electrode terminal 86 is connected to the outer perimeter surface of inside electrode layer 90 through conductive seal material 96, and is electrically connected to inside electrode layer 19 by direct contact with the top end surface 90c of inside electrode layer 90. A fuel gas flow path 98 communicating with inside electrode layer 90 fuel gas flow path 88 is formed at the center portion of inside electrode terminal 86.

Inside electrode layer 90 is formed, for example, from at least one of the following: a mixture of Ni with zirconia doped with Ca or at least one rare earth element selected from among Y, Sc, or the like; a mixture of Ni with ceria doped with at least one element selected from among rare earth elements; or a mixture of Ni with lanthanum gallate doped with at least one element selected from among Sr, Mg, Co, Fe, or Cu.

Electrolyte layer 94 is formed, for example, from at least one of the following: zirconia doped with at least one type of rare earth element selected from among Y, Sc, or the like; ceria doped with at least one type of element selected from among rare earth elements; or lanthanum gallate doped with at least one element selected from Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
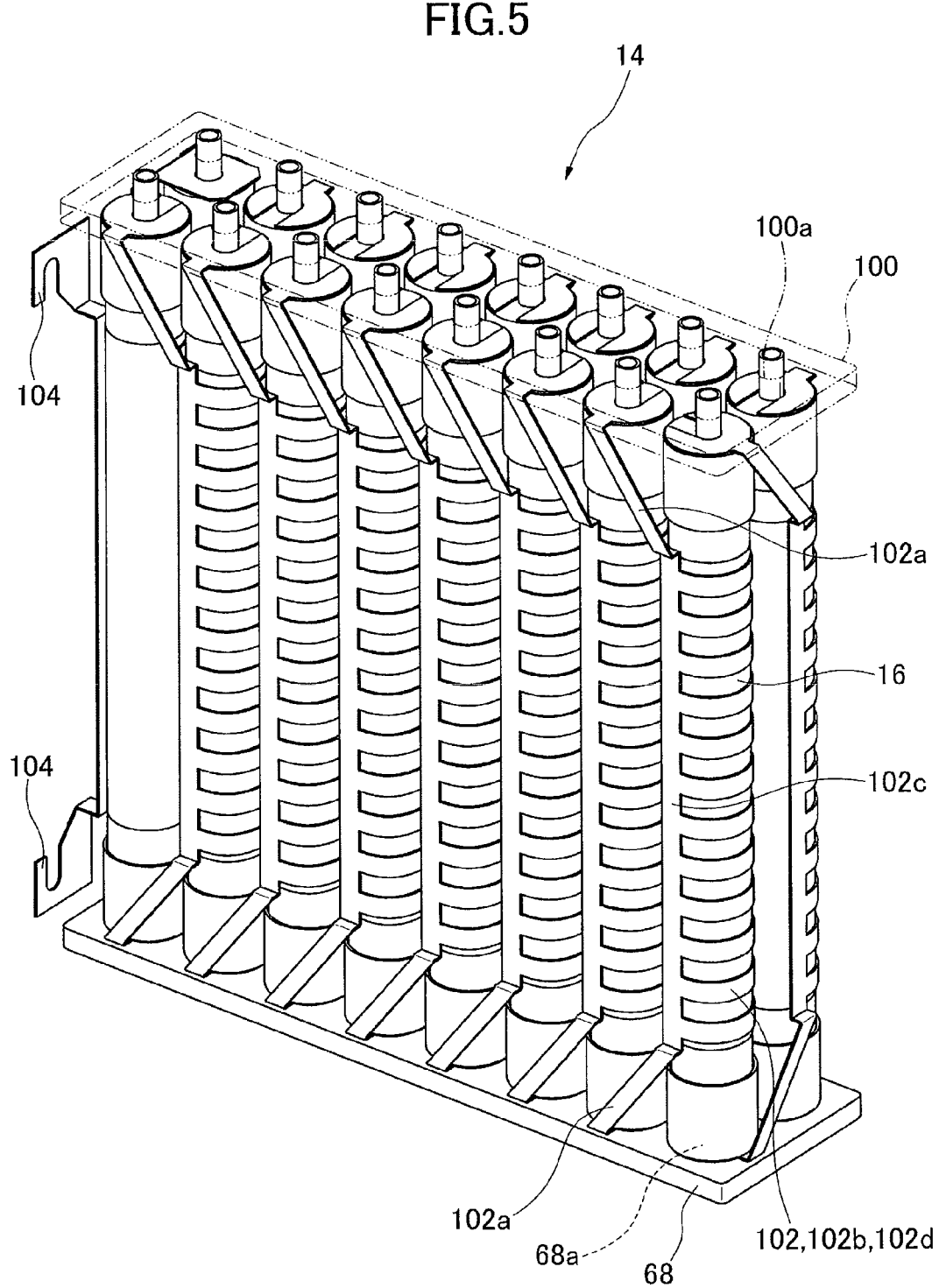
FIG. 5: A perspective view showing a fuel cell stack in a fuel cell system according to an embodiment of the present invention.

Next, referring to FIG. 5, we explain fuel cell stack 14. FIG. 5 is a perspective view showing the fuel cell stack in a solid oxide fuel cell system (SOFC) according to an embodiment of the present invention.

As shown in FIG. 5, fuel cell stack 14 is furnished with 16 fuel cell units 16; the top inside and bottom inside of these fuel cell units 16 are respectively supported by a lower support plate 68 and upper support plate 100. Through holes 68a and 100a, through which inside electrode terminal 86 can penetrate, are provided on this lower support plate 68 and outer support plate 100.

In addition, a collector 102 and an external terminal 104 are attached to fuel cell units 16. This collector 102 is integrally formed by a fuel electrode connecting portion 102a, electrically connected to inside electrode terminal 86 attached to inside electrode layer 90 serving as the fuel electrode, and by an air electrode connecting portion 102b, electrically connected to the entire external perimeter of outside electrode layer 92 serving as the air electrode. Air electrode connecting portion 102b is formed of a plumb portion 102c extending vertically along the surface of outside electrode layer 92, and multiple horizontal portions 102d extending horizontally from this vertical portion 102c along the surface of outside electrode layer 92. Fuel electrode connecting portion 102a extends in a straight line, in an upward or downward diagonal direction from the vertical portion 102c of air electrode connecting portion 102b, toward inside electrode terminals 86 positioned vertically on fuel cell units 16.

Furthermore, electrode terminals 86 at the top and bottom ends of the two fuel cell units 16 positioned at the end of fuel cell stack 14 (at the front and back on the left side in FIG. 5) are respectively connected to outside terminals 104. These external terminals 104 are connected to external terminals 104 (not shown) at the ends of adjacent fuel cell stack 14, and as described above, all of the 160 fuel cell units 16 are connected in series.

Figure 6:
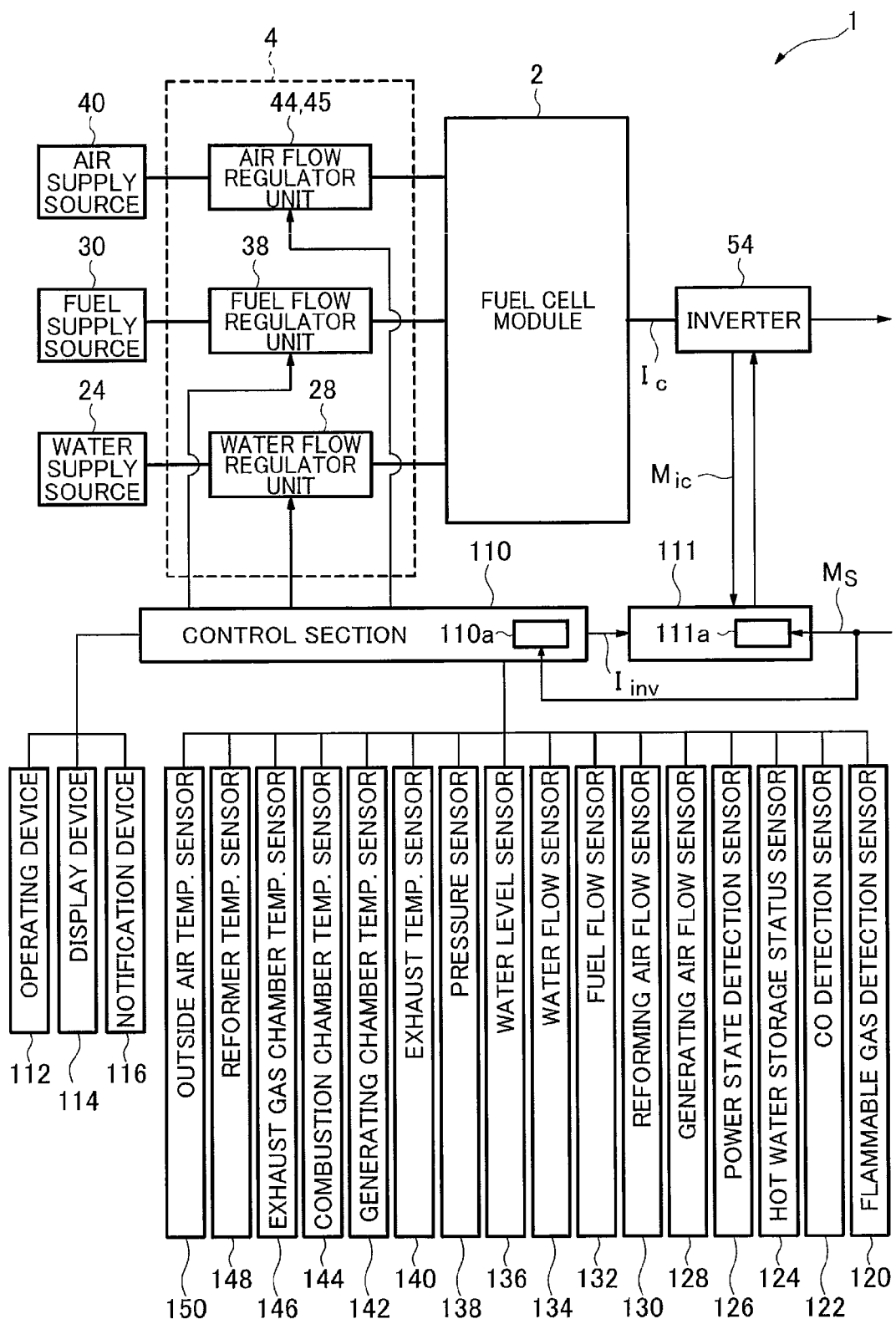
FIG. 6: A block diagram showing a fuel cell assembly according to an embodiment of the present invention.

Next, referring to FIG. 6, we discuss the sensors attached to the solid oxide fuel cell system (SOFC) according to the present embodiment. FIG. 6 is a block diagram showing a solid oxide fuel cell system (SOFC) according to an embodiment of the present invention.

As shown in FIG. 6, a solid oxide fuel cell system 1 comprises a control unit 110; connected to this control section 110 are: an operating device 112 provided with operating buttons such as "ON" or "OFF" for user operation; a display device 114 for displaying various data such as generator output (watts); and a notification device 116 for issuing warnings during abnormal states, etc. Note that this notification device 116 may also be connected to a remote control center to inform the control center of anomalies.

Next, signals from the various sensors described below are input to control unit 110.

First, flammable gas detection sensor 120 is for detecting gas leaks, and is attached to fuel cell module 2 and auxiliary unit 4.

CO detection sensor 122 is for sensing whether CO in the exhaust gas, which is supposed to be exhausted to the outside via exhaust gas conduit 80, etc., has leaked into the external housing (not shown) which covers fuel cell module 2 and auxiliary unit 4.

Water reservoir state detection sensor 124 is for sensing things such as the temperature and amount of hot water in a hot water heater (not shown).

Electrical power state detection sensor 126 is for sensing current, voltage, etc. in inverter 54 and a distribution panel (not shown).

Generator air flow detection sensor 128 is for detecting the flow volume of generating air supplied to generating chamber 10.

Reforming air flow volume sensor 130 is for detecting the volume of reforming air flow supplied to reformer 20.

Fuel flow volume sensor 132 is for detecting the flow volume of fuel gas supplied to reformer 20.

Water flow volume sensor 134 is for detecting the flow volume of pure water supplied to reformer 20.

Water level sensor 136 is for detecting the water level in pure water tank 26.

Pressure sensor 138 is for detecting pressure on the upstream side outside reformer 20.

Exhaust temperature sensor 140 is for detecting the temperature of exhaust gas flowing into hot water production device 50.

As shown in FIG. 3, generating chamber temperature sensor 142 is disposed on the front surface side and rear surface side around fuel cell assembly 12, and has the purpose of detecting the temperature near fuel cell stack 14 and estimating the temperature of fuel cell stack 14 (i.e., of the fuel cell 84 itself).

Combustion chamber temperature sensor 144 is for detecting the temperature in combustion chamber 18.

Exhaust gas chamber temperature sensor 146 is for detecting the temperature of exhaust gases in exhaust gas chamber 78.

Reformer temperature sensor 148 is for detecting the temperature of reformer 20; it calculates the reformer 20 temperature from the intake and exit temperatures on reformer 20.

If a solid oxide fuel cell system (SOFC) is positioned outdoors, outside air temperature sensor 150 detects the temperature of the outside atmosphere. Sensors to detect atmospheric humidity and the like may also be provided.

Signals from these various sensors are sent to control unit 110; control unit 110 sends control signals to water flow regulator unit 28, fuel flow regulator unit 38, reforming air flow regulator unit 44, and generating air flow regulator unit 45 based on data from the sensors, and controls the flow volumes in each of these units.

Figure 7:
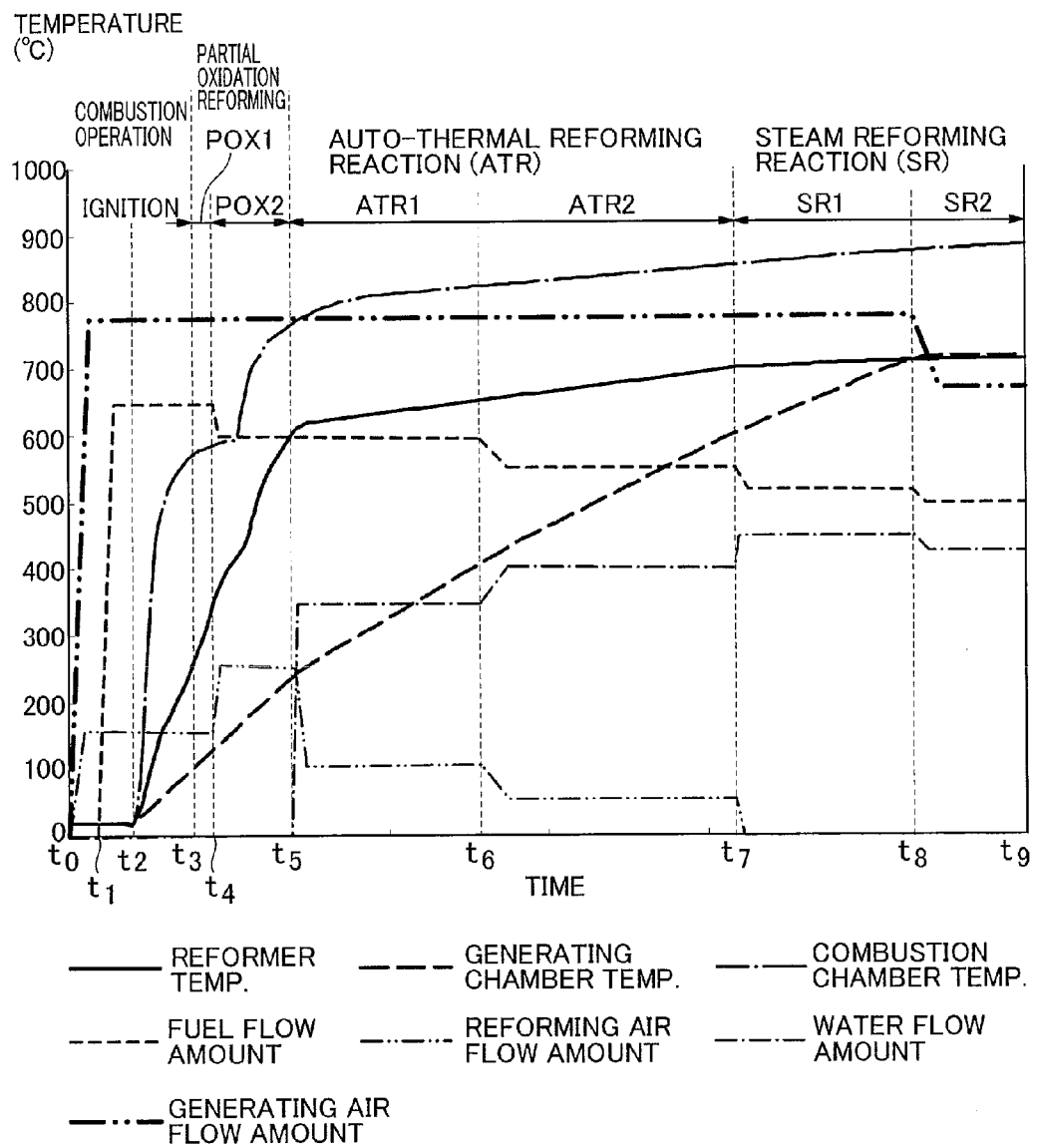
FIG. 7: A timing chart showing the operation at startup of a fuel cell assembly according to an embodiment of the present invention.

Next, referring to FIG. 7, we explain the operation of a solid oxide fuel cell system (SOFC) according to the present embodiment at the time of start up. FIG. 7 is a timing chart showing the operation of a solid oxide fuel cell system (SOFC) according to an embodiment of the present invention at the time of start up.

At first, the operation starts in a no-load state, i.e., with the circuit containing fuel cell module 2 in an open state, in order to warm up fuel cell module 2. At this point current does not flow in the circuit, therefore fuel cell module 2 does not generate electricity.

First, reforming air is supplied from reforming air flow regulator unit 44 through first heater 46 to reformer 20 in fuel cell module 2. Simultaneously, generating air is supplied from generating air flow regulator unit 45 through second heater 48 to the air heat exchanger 22 on fuel cell module 2, and this generating air reaches generating chamber 10 and combustion chamber 18.

Immediately thereafter, fuel gas is also supplied from fuel flow regulator unit 38, and fuel gas into which reforming air is blended passes through reformer 20, fuel cell stack 14, and fuel cell units 16 to reach combustion chamber 18.

Next, ignition device 83 causes ignition, and fuel gas and air (reforming air and generating air) supplied to combustion chamber 18 are combusted. This combustion of fuel gas and air produces exhaust gas; generating chamber 10 is warmed by this exhaust gas, and when the exhaust gas rises in the sealed space 8 of fuel cell module 2, the fuel gas, which includes reforming air in reformer 20, is warmed, as is also the generating air inside air heat exchanger 22.

At this point, fuel gas into which reforming air is blended is supplied to reformer 20 by fuel flow regulator unit 38 and reforming air flow regulator unit 44, therefore the partial oxidation reforming reaction POX given by Expression (1) proceeds. This partial oxidation reforming reaction POX is an exothermic reaction, and therefore has good startup characteristics. This elevated-temperature fuel gas is supplied from fuel gas supply line 64 to the bottom of fuel cell stack 14, and by this means fuel cell stack 14 is heated from the bottom; combustion chamber 18 is also heated by the combustion of fuel gas and air, so that fuel stack 14 is also heated from above, thereby enabling an essentially uniform rise in temperature along the vertical direction of fuel cell stack 14. Even though the partial oxidation reforming reaction POX is progressing, the ongoing combustion reaction between fuel gas and air is continued in combustion chamber 18.

$$C_mH_n + xO_2 \rightarrow aCO_2 + bCO + cH_2 \tag{1}$$

After the partial oxidation reforming reaction starts, when reformer temperature sensor 148 senses that reformer 20 has reached a predetermined temperature (e.g., 600° C.), a premixture of fuel gas and reforming air is supplied to reformer 20 by water flow regulator unit 28, fuel flow regulator unit 38, and reforming air flow regulator unit 44. At this point the auto-thermal reforming reaction ATR, which makes use of both the aforementioned partial oxidation reforming reaction POX and the steam reforming reaction SR described below, proceeds in reformer 20. This auto-thermal reforming reaction ATR can be internally thermally balanced, therefore the reaction proceeds in a thermally independent fashion inside reformer 20. In other words, if oxygen (air) is abundant, heat emission by the partial oxidation reforming reaction POX dominates, and if steam is abundant, the endothermic steam reforming reaction SR dominates. At this stage, the initial stage of startup has passed and some degree of elevated temperature has been achieved within generating chamber 10, therefore even if the endothermic reaction is dominant, no major drop in temperature will be caused. Also, the combustion reaction continues within combustion chamber 18 even while the auto-thermal reforming reaction ATR is proceeding.

When, after starting autothermal reforming reaction ATR, reformer temperature sensor 146 senses that reformer 20 has reached a predetermined temperature (e.g., 700° C.), the supply of reforming air by reforming air flow regulator unit 44 is stopped and the supply of steam by water flow regulator unit 28 is increased. A gas containing no air and containing only fuel gas and steam is thus supplied to reformer 20, where the steam reforming reaction SR of Expression (3) proceeds.

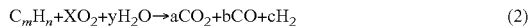

$$C_mH_n + XO_2 + yH_2O \rightarrow aCO_2 + bCO + cH_2 \quad (2)$$

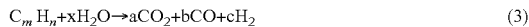

$$C_mH_n + xH_2O \rightarrow aCO_2 + bCO + cH_2 \quad (3)$$

This steam reforming reaction SR is an endothermic reaction, therefore the reaction proceeds while thermal balance is maintained with the combustion heat from combustion chamber 18. At this stage, fuel cell module 2 is in the final stages of startup, therefore the temperature has risen to a sufficiently high level within generating chamber 10 so that no major temperature drop is induced in generating chamber 10 even though an endothermic reaction is proceeding. Also, the combustion reaction continues to proceed in combustion chamber 18 even though the steam reforming reaction SR is proceeding.

In this manner, after fuel cell module 2 has been ignited by ignition device 83 the temperature inside generating chamber 10 gradually rises due to the sequentially proceeding partial oxidation reforming reaction POX, auto-thermal reforming reaction ATR, and steam reforming reaction SR. Next, when the temperatures of the interior of generating chamber 10 and individual fuel cells 84 reach a predetermined generating temperature below the rated temperature at which fuel cell module 2 can be stably operated, the circuit including fuel cell module 2 is closed and electrical generation by fuel cell module 2 begins, such that current flows in the circuit. Generation of electricity by fuel cell module 2 causes fuel cell 84 itself to emit heat, such that the temperature of fuel cell 84 also rises. As a result, the rated temperature for operating fuel cell module 2, for example 600 [° C.] to 800 [° C.], is reached.

In order to maintain the rated temperature thereafter, fuel gas and air are supplied in a quantity greater than the fuel gas and air consumed by individual fuel cells 84, and combustion in combustion chamber 18 is continued. Note that during electrical generation, generation of electricity by the high reforming-efficiency steam reforming reaction SR proceeds.

Figure 8:
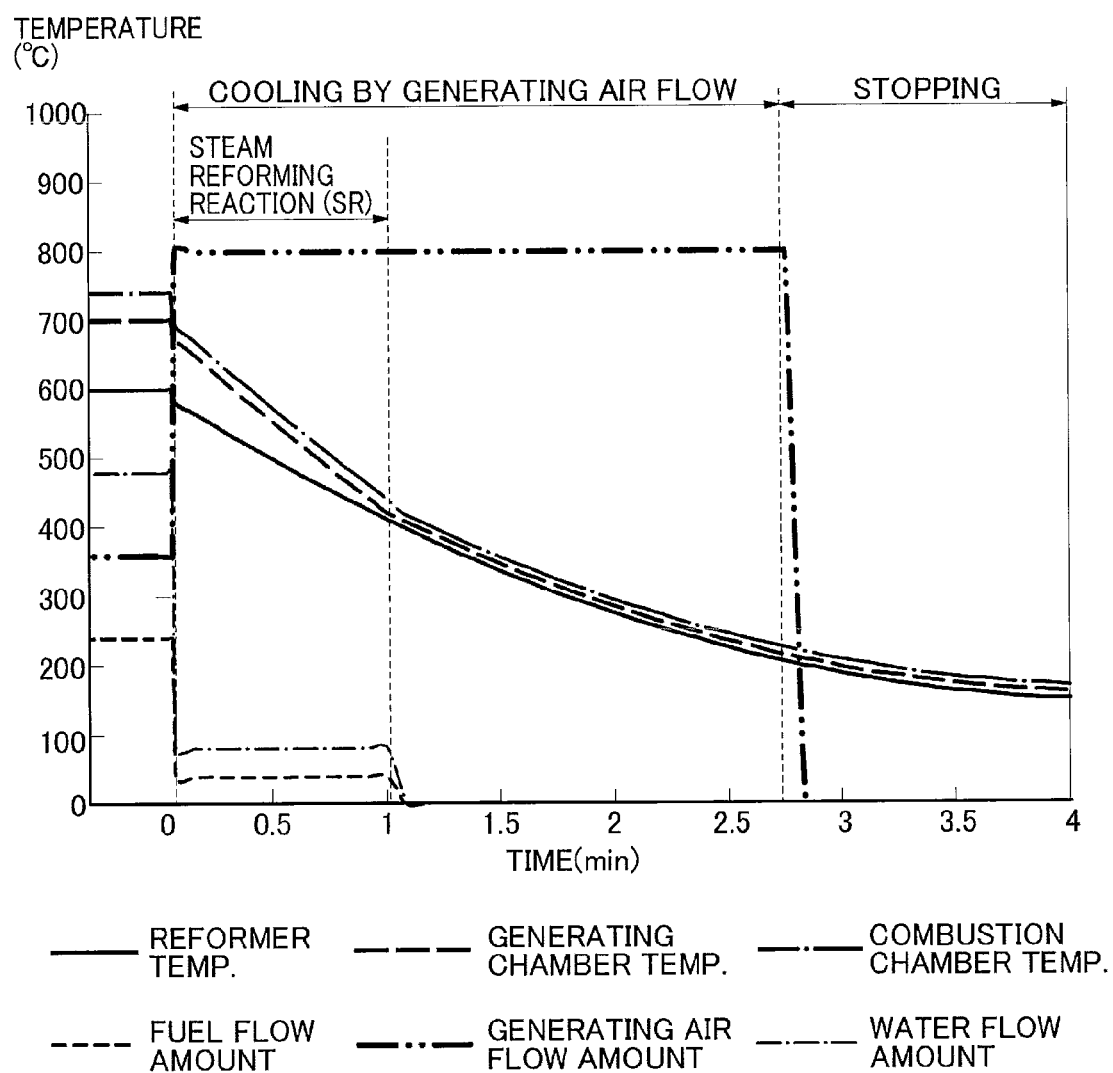
FIG. 8: A timing chart showing the operation of a fuel cell system according to an embodiment of the present invention when stopped.

Next, referring to FIG. 8, we discuss the operation when stopping the solid oxide fuel cell system (SOFC) of the present embodiment. FIG. 8 is a timing chart showing what occurs upon stopping the operation of solid oxide fuel cell system (SOFC) of the present embodiment.

As shown in FIG. 8, when the operation of fuel cell module 2 is stopped, fuel flow regulator unit 38 and water flow regulator unit 28 are first controlled to reduce the quantity of fuel gas and steam being supplied to reformer 20.

When stopping the operation of fuel cell module 2, the amount of generating air supplied by reforming air flow regulator unit 44 into fuel cell module 2 is being increased at the same time that the amount of fuel gas and steam being supplied to reformer 20 is being reduced; fuel cell assembly 12 and reformer 20 are air cooled to reduce their temperatures. Thereafter when the reformer 20 temperature has dropped to a predetermined temperature, for example 400 [° C.], the supply of fuel gas and steam to the reformer 20 is stopped, and the reformer 20 steam reforming reaction SR is ended. Supply of generating air continues until the temperature in reformer 20 reaches a predetermined temperature, e.g. 200° C., and when the predetermined temperature is reached, the supply of generating air from generating air flow regulator unit 45 is stopped.

Thus in the present embodiment when operation of the fuel cell module 2 is stopped, the steam reforming reaction SR by reformer 20 and cooling by generating air are used in combination, so that operation of the fuel cell module can be stopped relatively quickly.

Next, referring to FIG. 6, we explain the control of solid oxide fuel cell system 1 according to an embodiment of the invention.

First, as shown in FIG. 6, solid oxide fuel cell system 1 comprises control section 110, which is a fuel cell controller, and inverter control section 111, which is an inverter controller.

Figure 15:
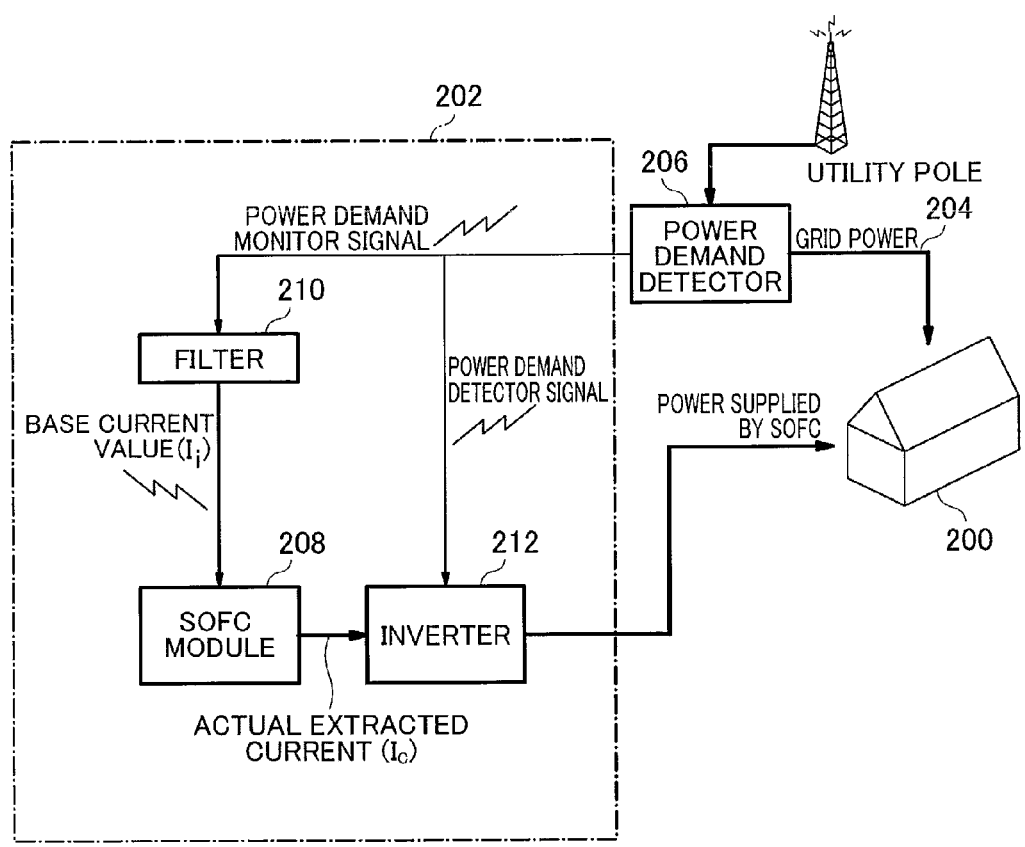
FIG. 15: An example of a conventional system for supplying electrical power to a residence using a fuel cell.

Control section 110 comprises first power demand detection circuit 110*a*, which detects power demand based on a power demand signal Ms input from power demand detector 206 (FIG. 15). The total power demand consumed by facilities like residence 200 (FIG. 15) is covered by grid power supplied from commercial power sources and power supplied from solid oxide fuel cell system 1. If using a current transformer as power demand detector 206, the grid current (purchased current) can be obtained as a monitor signal to serve as power demand monitor signal Ms, therefore power demand can be obtained, together with grid power and electrical generation interconnected power, from the AC voltage at the output terminal obtained from inverter 54, and from the electrical generation interconnected output power. First power demand detection circuit 110*a* can also be used, by indirectly obtaining that information from inverter 54. In the present embodiment, it is the grid power of the total power demand that is input to control section 110 as the power demand monitor signal Ms, but it is also possible for the control section to use total power demand as the power demand monitor signal.

Also, control section 110 is constituted to control water flow volume regulator unit 28, fuel flow regulator unit 38, and reform air flow regulator unit 44, etc. based on power demand monitor signal Ms and the like. Control section 110 sets the extractable current value Iinv based on input signals from various sensors and on power demand monitor signal Ms, and outputs this value to inverter control section 111. Specifically, control section 110 comprises a microprocessor, memory, programs for operating these, and so forth.

Inverter control section 111 comprises a second power demand detection circuit 111*a*, and detects power demand based on the power demand monitor signal Ms input from power demand detector 206 (FIG. 15). When using a current transformer for power demand detector 20, the grid current (purchased current) is obtained as a monitor signal for use as power demand monitor signal Ms, therefore power demand is obtained together with grid power and electrical generation interconnected power using an output terminal AC voltage from a voltage detection means provided on an output terminal, obtained from inverter 54, and the electrical generation interconnected output power from an output power detection means on the output section. That information can also be conveyed to control section 110. Inverter control section 111 controls inverter 54 based on power demand monitor signal Ms and the extractable current value Iinv input from control section 110, and actual extracted current Ic is extracted from fuel cell module 2 within a range not exceeding extractable current value Iinv. Specifically, inverter control section 111 comprises a microprocessor, memory, programs for operating these, and the like.

Control section 110 comprises an extractable current setting means for sequentially setting extractable current value Iinv, being the maximum current extractable from fuel cell module 2 at a given time in response to the state of fuel cell module 2. Inverter control section 111 controls inverter 54 independently of control section 110, extracts actual extracted current Ic in a range not exceeding the extractable current value Iinv input from control section 110, and supplies facilities such as residence 200 (FIG. 15). Note that in the present embodiment the control section 110 control cycle is 500 [msec], and the inverter control section 111 control cycle is 1 [msec] or less. Thus control section 110 is operated at a control cycle necessary and sufficient to control a slow-response fuel cell module 2, and inverter control section 111 is operated at a short control cycle so that power can be extracted from inverter 54 in response to power demand, which fluctuates rapidly. Also, control of control section 110 and inverter control section 111 is not synchronized, and controls inverter 54 independently of control section 110 based on the extractable current value Iinv input from control section 110, and on power demand monitor signal Ms.

Next, referring to FIGS. 9 through 14, we explain the operation of solid oxide fuel cell system 1 according to an embodiment of the invention. FIG. 9 is a control table for setting extractable current value Iinv using control section 110.

Figure 10:
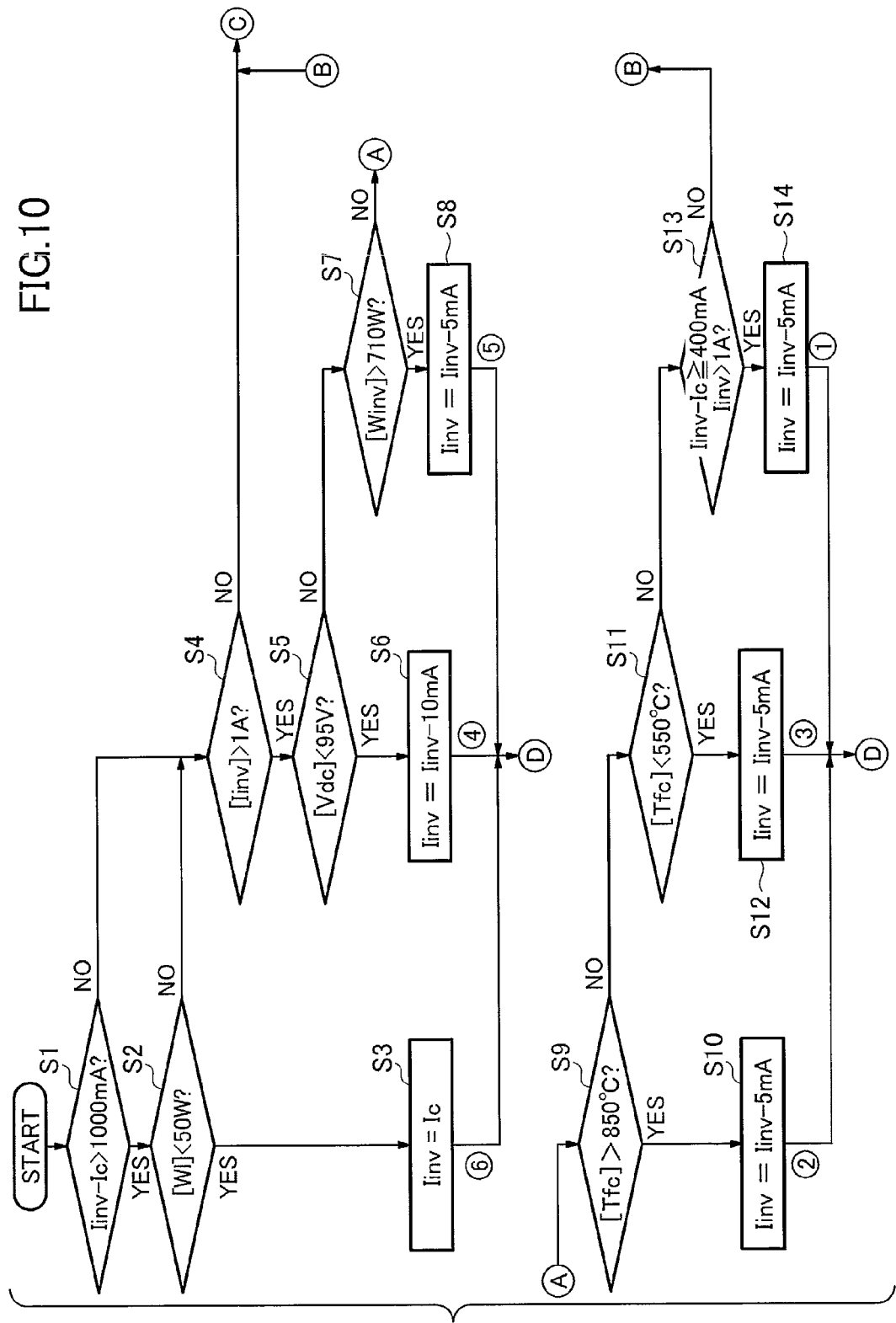
FIG. 10: A flow chart showing control executed by a control section.
Figure 11:
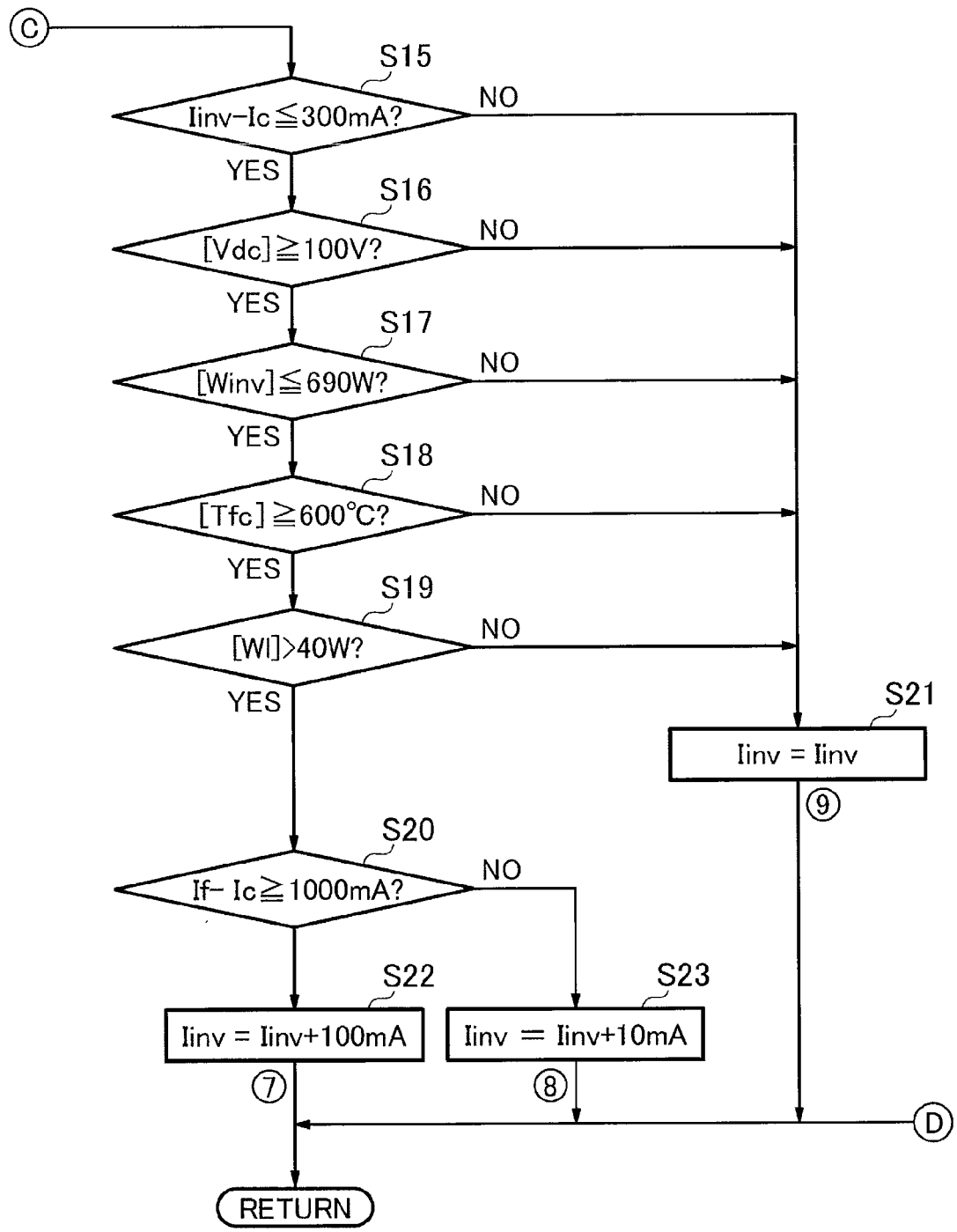
FIG. 11: A flow chart showing control executed by a control section.

FIGS. 10 and 11 are flowcharts for determining extractable current value Tiny by applying the control table shown in FIG. 9.

As shown in FIG. 9, control section 110 increases, decreases, or maintains extractable current value Iinv based on generating chamber temperature Tfc, generating voltage Vdc output from fuel cell module 2, grid power WI, being the power supplied to facilities such as residences from commercial power sources, interconnect power Winv, being the power output from inverter 54, and fuel supply current value If.

Generating chamber temperature Tfc is the temperature of the generating chamber 10 housed in individual fuel cell units 16; it is detected by generating chamber temperature sensors 142 and input to control section 110. Note that in this Specification, temperatures serving as indicators of the fuel cell module 2 generating capacity, such as generating chamber temperature Tfc, are referred to as the "fuel cell module temperature."

Generated voltage Vdc is the output voltage output from fuel cell module 2.

Grid power WI is the power supplied by commercial power sources to residences and the like, which corresponds to total facility power demand minus power supplied by fuel cells, and is detected based on power demand monitor signal Ms.

Interconnect power Winv is the power output from inverter 54. Power actually extracted at inverter 54 from fuel cell module 2 is detected by power state detecting sensor 126, and power converted from this power is output from inverter 54. The actual extracted current Ic [A] actually output from fuel cell module 2 is obtained based on the power detected by power state detecting sensor 126. Therefore power state detecting sensor 126 functions as an extracted current detection circuit.

Fuel supply current value If is a base current value for obtaining the fuel supply amount, and corresponds to the current value which can be generated using the fuel supply amount (L/min) supplied to fuel cell module 2. Therefore the fuel supply current value If is set so as never to fall below extractable current value Iinv.

Control section 110 determines whether the current state of fuel cell module 2 matches any of line Nos. 1 through 9 in FIG. 9, and changes or maintains the extractable current value Iinv shown on the right-most column of FIG. 9.

For example, if all the conditions noted in line No. 1 of FIG. 9 are simultaneously met, control section 110 changes extractable current value Iinv to reduce it by 5 [mA], as shown in the right column of line No. 1. As explained above, in the present embodiment the control cycle of control section 110 is 500 [msec], therefore if the state continues in which the line No. 1 condition is met, the extractable current value Iinv is lowered by 5 [mA] every 500 [msec]. In this case the extractable current value Iinv is reduced at a current reduction rate of change of 10 [mA/sec].

Similarly, if all the conditions noted in line No. 8 of FIG. 9 are simultaneously met, control section 110 changes extractable current value Iinv so as to increase it by 10 [mA], as shown in the right hand column of line No. 8. Therefore if the state continues in which the line No. 8 condition is met, extractable current value Iinv is raised at a first current rise rate of 20 [mA/sec].

If none of the conditions in line Nos. 1-8 of FIG. 9 is satisfied, then the line No. 9 condition is matched, and extractable current value Iinv is maintained as is without change.

Next, referring to FIGS. 10 and 11, we explain the procedure for judging the FIG. 9 control table conditions. Note that letters A-D in FIGS. 10 and 11 indicate processing endpoints. For example, the flow transition from "C" in FIG. 10 to "C" in FIG. 11.

As explained below, even under conditions when extractable current value Iinv should be increased, such as when power demand is increasing, control section 110 increases extractable current value Iinv only when none of the predetermined multiple increase limit conditions is met. Furthermore, the increase limit condition includes multiple current reducing conditions and current maintenance condition, and when these conditions are met, extractable current value Iinv is reduced or maintained. The multiple current reducing conditions (steps S5, S7, S9, S11, and S13 in FIG. 10) are applied with priority before the multiple current maintenance conditions (steps S15, S16, S17, S18, and S19 in FIG. 11).

First, step S1 in FIG. 10 is a step for judging whether an extremely large deviation has occurred between extractable current value Iinv and actual extracted current Ic, whereby a judgment is made as to whether a deviation of greater than 1000 [mA] has occurred between the two. The case in which a deviation larger than 1000 [mA] occurs for the first time during a control cycle when the difference between extractable current value Iinv and actual extracted current Ic is small is the case in which a sharp reduction in total power demand occurs, or actual extracted current Ic is sharply reduced for some reason, producing a deviation, in which case the system advances to step S2.

In step S2, a judgment is made as to whether grid power WI is less than 50 [W]. If grid power WI is less than 50 [W], there is a high probability of a "reverse current flow (grid power WI turns negative)" occurring, in which output power from inverter 54 flows into the commercial power supply. Therefore this state is judged to be one in which inverter 54 has suddenly reduced actual extracted current Ic in order to prevent the occurrence of a reverse current flow due to a large drop in total power demand according to the determinations made in S2 and S1. Note that the reason for setting the value of grid power WI in S2 at 50 [W] is to provide a 50 [W] margin so that reverse current flow will not occur under any circumstance.

Next, if a YES is judged in both S1 and S2, i.e., in cases when an anti-reverse current flow control is performed by inverter 54 in conjunction with a large drop in total power demand, control section 110 in step S3 suddenly reduces the value of the extractable current value Iinv instructed to inverter control section 111 down to the value of the actual extracted current Ic (corresponding to FIG. 9, No. 6). With the completion of the processing in step S3, one iteration of the FIG. 10 and FIG. 11 flowcharts is completed. Inverter 54 extracts actual extracted current Ic in a range not exceeding the value of extractable current Iinv, therefore by reducing the extractable current value Iinv such that the extractable current value Iinv=actual extracted current Ic, inverter 54 is restricted from responses such as arbitrarily increasing extracted current beyond the current extracted current value Ic. If total power demand suddenly drops, there is a high probability that total power demand will soon after quickly recover (increase), but if inverter 54 suddenly extracts power in order to respond to the recovered total power demand when there is a large deviation exceeding 1000 [mA], there can be a control overshoot or the like resulting in the inverter 54 performing a power extraction which mistakenly exceeds power demand or extractable current value Iinv; this is prevented in advance. In other words, with a small deviation such as 1000 [mA] or less, inverter 54 is allowed to quickly perform a power extraction up to extractable current value Iinv, which is at a higher level than actual extracted current Ic, since no control is executed to cause the extractable current value Iinv to be the actual extracted current Ic. This is a further measure, taken to enable quick following of the recovery of total power demand, since no problem such as excessive power extraction due to overshoot arises if the deviation is small.

On the other hand, if a judgment is made in the step S1 and S2 determinations that the situation is not one in which a reverse current associated with a very large drop in total power demand will arise, the system advances to step S4. In step S4 a judgment is made of whether extractable current value Iinv is greater than 1 A. If extractable current value Iinv is greater than 1 A, the system advances to step S5, and a judgment is made as to whether generating voltage Vdc is less than 95 V. If generating voltage Vdc is less than 95 V, the system advances to step S6.

In step S6, control section 110 reduces the value of the extractable current value Tiny instructed to inverter control section 111 by 10 [mA] (corresponding to line No. 4 in FIG. 9). With the completion of the step S6 processing, one iteration of the FIG. 10 and FIG. 11 flowcharts is completed. If the processing in step S6 is continuously executed each time the FIG. 10 flowchart is executed, the extractable current value Iinv is decreased at a current decrease change rate of 20 [mA/sec]. If generating voltage Vdc is less than 95 V, a voltage decrease is assumed to occur due to degradation of the fuel cell module when power is extracted at inverter 54 from fuel cell module 2, therefore by reducing extractable current value Iinv, the current extracted at inverter 54 is suppressed, thereby lightening the load imposed on fuel cell module 2.

Meanwhile, if generating voltage Vdc is 95 V or greater in step S5, the system advances to step S7. In step S7 a judgment is made as to whether interconnect power Winv exceeds 710 W. If interconnect power Winv exceeds 710 W, the system advances to step S8, and step S8 control section 110 reduces the value of the extractable current value Iinv instructed to inverter control section 111 by 5 [mA] (corresponding to line No. 5 in FIG. 9). In other words, if interconnect power Winv exceeds 710 [W], the output power from fuel cell module 2 exceeds rated power, therefore the current extracted from fuel cell module 2 is reduced so as not to exceed rated power. With the completion of the processing in step S8, one iteration of the FIG. 10 and FIG. 11 flowcharts is completed. If the processing in step S8 is continuously executed each time the FIG. 10 flowchart is executed, the extractable current value Iinv is decreased at a current decrease change rate of 10 [mA/sec].

Thus by using those of the multiple current reduction conditions which apply, control section 110 changes the extractable current value Iinv so that the rates of change at which the extractable current value Iinv is reduced differ.

In step S7, meanwhile, if interconnect power Winv is 710 [W] or less, the system advances to step S9. In step S9, a judgment is made as to whether generating chamber temperature Tfc exceeds 850 [° C.]. If generating chamber temperature Tfc exceeds 850 [° C.], the system advances to step S10; in step S10, control section 110 reduces the value of the extractable current value Iinv instructed to inverter control section 111 by 5 [mA] (corresponding to line No. 2 in FIG. 9). I.e., if generating chamber temperature Tfc exceeds 850 [° C.], the appropriate operating temperature for fuel cell module 2 is exceeded, therefore the value of extractable current Iinv is reduced and the system waits for a drop in temperature. With the completion of the processing in step S10, one iteration of the FIG. 10 and FIG. 11 flowcharts is completed. If the processing in step S10 is continuously executed each time the FIG. 10 flowchart is executed, extractable current value Iinv is decreased at a current decrease change rate of 10 [mA/sec].

On the other hand, if generating chamber temperature Tfc is 850 [° C.] or less in step S9, the system advances to step S11. In step S11 a judgment is made as to whether generating chamber temperature Tfc is less than 550 [° C.]. If generating chamber temperature Tfc is less than 550 [° C.], the system advances to step S12; in step S12, control section 110 reduces the value of the extractable current value Iinv instructed to inverter control section 111 by 5 [mA] (corresponding to line No. 3 in FIG. 9). In other words, if generating chamber temperature Tfc is less than 550 [° C.], the temperature is below the appropriate temperature at which fuel cell module 2 can generate electricity, so the value of extractable current Iinv is reduced. Fuel consumed for electrical generation is thus reduced, and fuel is directed to heating individual fuel cell units 16, raising the temperature. With the completion of the processing in step S12, one iteration of the FIG. 10 and FIG. 11 flowcharts is completed. If the processing in step S12 is continuously executed each time the FIG. 10 flowchart is executed, extractable current value Iinv is decreased at a current decrease change rate of 10 [mA/sec].

On the other hand, if generating chamber temperature Tfc is 550 [° C.] or greater in step S11, the system advances to step S13. In step S13 a judgment is made as to whether the difference between extractable current value Iinv and actual extracted current Ic exceeds 400 [mA] and extractable current value Iinv exceeds 1 A. If the difference between the extractable current value Iinv and actual extracted current Ic exceeds 400 [mA] and the extractable current value Iinv exceeds 1 A, the system advances to step S14, and in step S14, control section 110 reduces the value of the extractable current value Tiny instructed to inverter control section 111 by 5 [mA] (corresponding to line No. 1 in FIG. 9). In other words, if the difference between extractable current value Iinv and actual extracted current Ic exceeds 400 [mA], there is too little extracted current Ic actually extracted from fuel cell module 2 relative to the extractable current value Iinv which can be extracted, and fuel is being wastefully supplied, so the extractable current Iinv is reduced and fuel wastage is suppressed. With the completion of the processing in step S14, one iteration of the FIG. 10 and FIG. 11 flowcharts is completed. If the processing in step S14 is continuously executed each time the FIG. 10 flowchart is executed, extractable current value Tiny is decreased at a current decrease change rate of 10 [mA/sec].

Thus if even one of the multiple current reduction conditions (steps S5, S7, S9, S11, and S13 in FIG. 10) applies, extractable current value Iinv is reduced even when the power demand is rising (steps S6, S8, S10, S12, S14).

In step S4, meanwhile, when extractable current value Iinv is 1 [A] or less, and in step S13, when the difference between extractable current value Iinv and actual extracted current value Ic is 400 [mA] or less, the system advances to step S15 in FIG. 11.

In step S15, a judgment is made as to whether the difference between extractable current value Iinv and actual extracted current value Ic is 300 [mA] or less; in step S16 a judgment is made as to whether generated voltage Vdc is 100 [V] or greater; in step S17, a judgment is made as to whether extractable current value Iinv is 690 [W] or less; in step S18 a judgment is made as to whether generating chamber temperature Tfc is 600 [° C.] or more; and in step S19, a judgment is made as to whether grid power WI exceeds 40 [W]. If all of these conditions are satisfied, the system advances to step S20; if there is even one which is not satisfied (corresponding to line No. 9 in FIG. 9), the system advances to step S21. In step S21, the value of extractable current Iinv is not changed but maintained at the previous value, and one iteration of the FIG. 10 and FIG. 11 flowcharts is completed.

Thus in the solid oxide fuel cell system 1 of the present embodiment, if certain condition is not met, even when power demand is rising, extractable current value Iinv is kept constant (step S21 in FIG. 11). Focusing on generating chamber temperature Tfc, when generating chamber temperature Tfc exceeds the upper limit threshold value of 850 [° C.], extractable current value Iinv is lowered (steps S9, S10 in FIG. 10), and if generating chamber temperature Tfc is less than the lower limit threshold value of 600 [° C.], the extractable current value Iinv is maintained (steps S18, S21 in FIG. 11). If generating chamber temperature Tfc is even lower, below 550 [C], extractable current value Iinv is reduced (steps S11, S12 in FIG. 10).

On the other hand, in the processing which occurs in step S20 and beyond, the value of extractable current Iinv is increased. Control section 110 increases the extractable current value Iinv (steps S22, S23 in FIG. 11) only when none of the multiple current maintenance conditions (steps S15, S16, S17, S18, and S19 in FIG. 11) is matched.

I.e., when the difference between extractable current value Iinv and actual extracted current Ic exceeds 300 [mA] (step S15), that difference between extractable current value Iinv and actual extracted current Ic is relatively large, therefore the extractable current value Iinv should not be increased. If generating voltage Vdc is lower than 100 V (step S16), then extractable current value Iinv should not be raised, increasing the current extractable from fuel cell module 2. Furthermore, if interconnect power Winv exceeds 690 [W] (step S17), the output power from fuel cell module 2 has already essentially reached the rated output power, therefore the current which can be extracted from fuel cell module 2 should not be increased.

In addition, if generating chamber temperature Tfc is less than 600 [° C.] (step S18), fuel cell module 2 has not reached a temperature at which electricity can be sufficiently generated, therefore the extractable current value Iinv should not be raised, and current extractable from fuel cell module 2 increased, thereby placing a load on individual fuel cell units 16. If grid power WI is less than 40 [W] (step S19), "reverse power flow" can easily occur, therefore the current extractable from fuel cell module 2 should not be increased.

If all the conditions from steps S15 through S19 are met, the system advances to step S20. In step S20 a judgment is made as to whether the difference between fuel supply current value If and actual extracted current value Ic is 1000 [mA] or greater. A fuel gas supply amount corresponding to fuel supply current value If is obtained and supplied to fuel cell module 2, and the system is generating electricity. In other words this value is a conversion of the electrical current value which can be generated by fuel cell module 2 using that fuel. For example, if a fuel supply amount [L/min] corresponding to a fuel supply current value If =5 [A] is being supplied, fuel cell module 2 is potentially capable of safely and stably outputting a 5 [A] current. Therefore if the difference between the fuel supply current value If and the actual extracted current value Ic is 1000 [mA], this means that an amount of fuel capable of outputting 1 [A] more current than the actually generated extracted current value Ic is being supplied to fuel cell module 2.

If, in step S20, the difference between fuel supply current value If and actual extracted current value Ic is 1000 [mA] or greater, the system advances to step S22; if less than 1000 [mA], the system advances to step S23. In step S22, because a large amount of extra fuel is being supplied to fuel cell module 2, control section 110 increases the value of the extractable current value Iinv instructed to the inverter control section 111 by 100 [mA] (corresponding to line No. 9 in FIG. 9), rapidly raising the extractable current value Tiny. The completion of the step S22 processing completes one iteration of the FIGS. 10 and 11 flowcharts. If the processing in step S22 is continuously executed each time the FIG. 11 flowchart is executed, extractable current value Iinv is raised at a second current increase rate of change, being 200 [mA/sec].

On the other hand, the condition for raising extractable current value Iinv are present in step S23, but since this is not a situation in which a large amount of extra fuel is being supplied to fuel cell module 2, control section 110 increases the value of extractable current Iinv instructed to inverter control section 111 by 10 [mA] (corresponding to line No. 8 in FIG. 9), gradually raising the extractable current value Iinv. With the completion of the processing in step S23, one iteration of the FIG. 10 and FIG. 11 flowcharts is completed. If the processing in step S23 is continuously executed each time the FIG. 11 flow chart is executed, extractable current value Iinv will be increased at a first current increase change rate of 20 [mA/sec].

Figure 12:
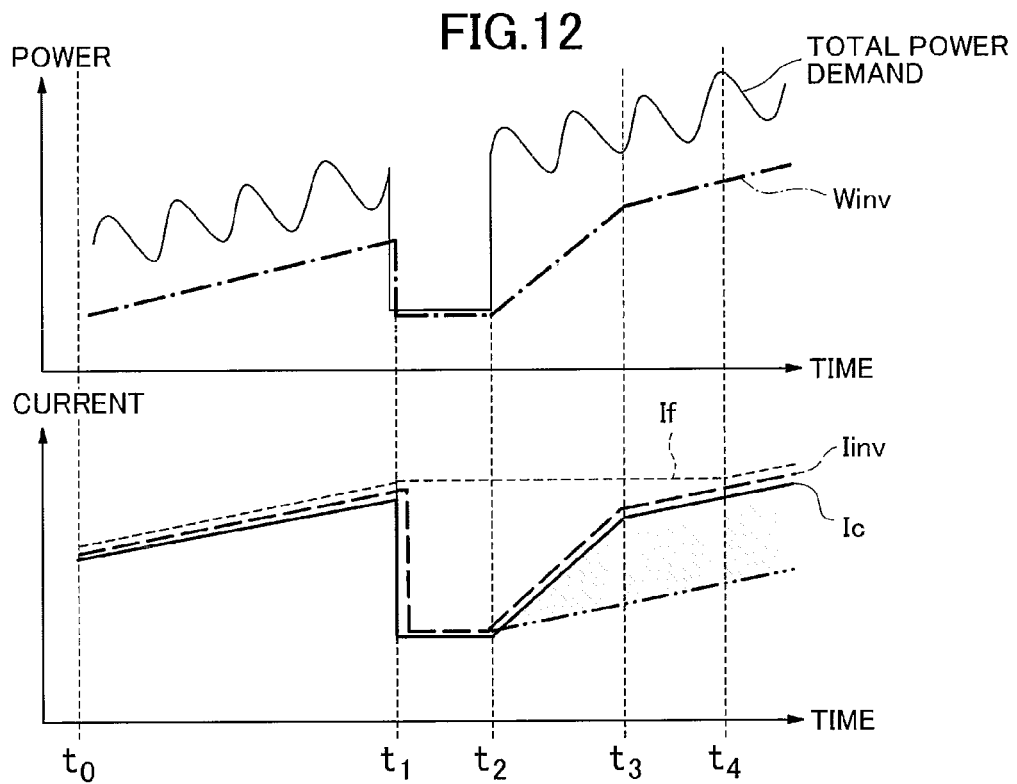
FIG. 12: A timing chart showing the operation of a fuel cell system according to an embodiment of the present invention.
Figure 13:
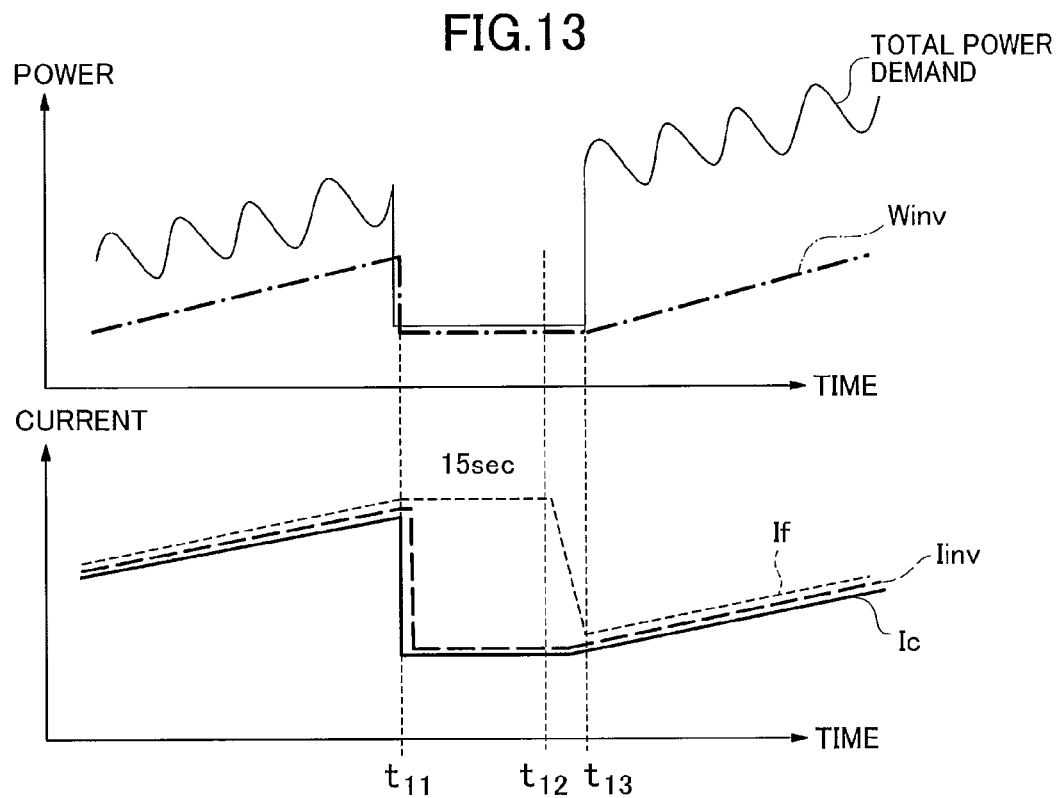
FIG. 13: A timing chart showing the operation of a fuel cell system according to an embodiment of the present invention.
Figure 14:
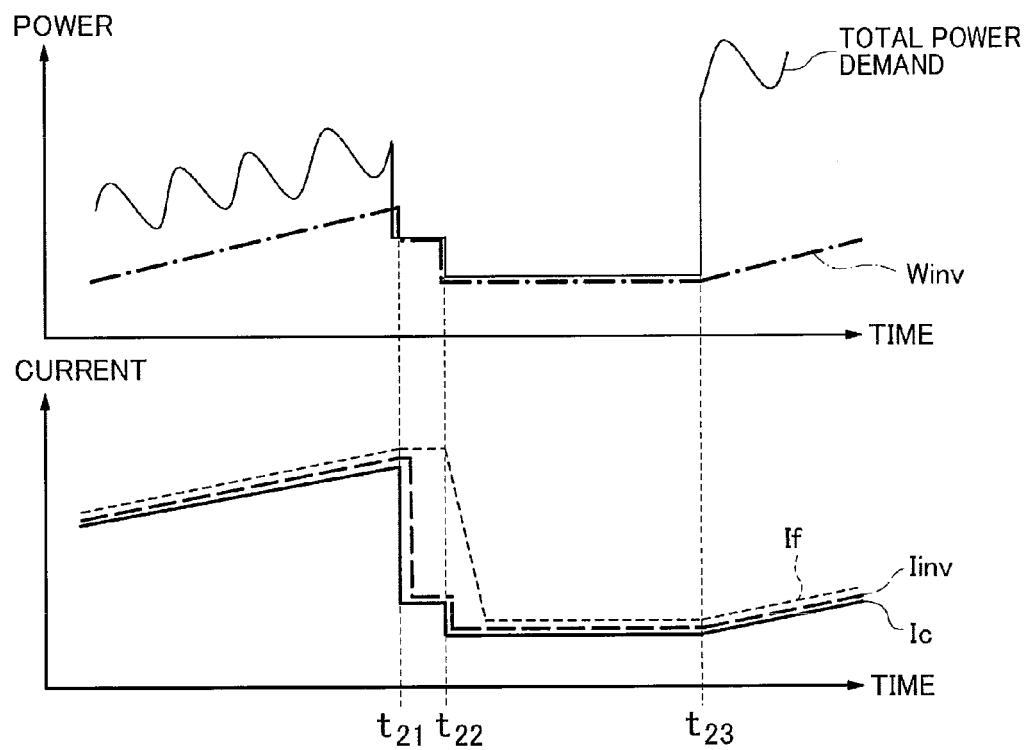
FIG. 14: A timing chart showing the operation of a fuel cell system according to an embodiment of the present invention.

Next, referring to FIGS. 12 through 14, we explain one example of the operation of solid oxide fuel cell system 1 according to the present embodiment.

FIG. 12 shows a graph of power on the top and current on the bottom.

First, as shown by the thin solid line on the top half of FIG. 12, if the total power demand from facilities such as residence 200 etc. is gradually increasing as it fluctuates, extractable current value Iinv will also be gradually increased in response (times t0-t1 in FIG. 12). During this interval, step S23 in the FIG. 11 flowchart is repeated, and extractable current value Iinv is raised at a first current rise rate of 20 [mA/sec]. If extractable current value Iinv is input from control section 110, inverter control section 111 controls 54 independently from the control of control section 110, and an actual extracted current Ic not exceeding extractable current value Iinv is extracted from fuel cell module 2 At times t0-t1 in FIG.

12, the total power demand at all times exceeds extractable current value Iinv, therefore actual extracted current Ic matches extractable current value Iinv, which is the upper limit value of what can be extracted, and interconnect power Winv is also raised together with actual extracted current Ic. In such circumstances, notwithstanding the fact that inverter control section 111 is controlling inverter 54 independently from control section 110, actual extracted current Ic is under the dominance of control section 110. Note that fuel supply current value If is raised slightly ahead of extractable current value Iinv. The insufficient power resulting from the difference between the total power demand and interconnect power Winv is made up by grid power WI.

Next, at time t1 in FIG. 12, if total power demand suddenly decreases, inverter control section 111 controls inverter 54 in response to this reduction, causing a decrease in the actual extracted current Ic (interconnect power Winv) extracted from fuel cell module 2. Control section 110 causes extractable current value Iinv to be reduced to the same value as actual extracted current Ic (step S3 in FIG. 10) so that no excessive power extraction occurs due to the previously noted overshoot. At the same time, at time t1, control section 110 maintains the value of fuel supply current If at the previous value, not reducing it. This is because suddenly reducing the fuel supply amount (fuel supply current value If) together with extractable current value Iinv invites a sudden temperature drop, so that not only does the operation of fuel cell module 2 become unstable, and since there is a high probability that the power demand will increase immediately after a sudden drop in power demand, one would like to be able follow this quickly, but because of the reduction in the temperature of fuel cell module 2, a long time period is required for recovery, so the fuel supply current value If is not reduced. Therefore if extractable current value Iinv is suddenly reduced, fuel supply current value If is reduced at a further delay. In a state whereby fuel supply current value If is being maintained immediately after the reduction in the extractable current value Iinv, there is a margin in the fuel supply amount to the fuel cell module 2 relative to extractable current value Iinv.

At time t1-t2 in FIG. 12, the total power demand is still reduced, therefore generating chamber 10 maintains a fixed extractable current value Iinv (step S21 in FIG. 11), and the fuel supply current value If is also maintained at a fixed value, with extra fuel.

Next, when total power demand again rises at time t2, because fuel supply current value If is maintained at a fixed level and there is extra margin in the fuel supply amount to fuel cell module 2, control section 110 causes the value of the extractable current value Iinv to rapidly rise at a second current rise rate of change which is 200 [mA/sec] greater than the normal rate of change (the first current rise rate of change) (step S22 in FIG. 11). This results in improved load following characteristics relative to total power demand. I.e., when the value of extractable current Iinv output from control section 110 is raised, inverter control section 111 extracts actual extracted current Ic from fuel cell module 2 within the range of this increased extractable current value Iinv. Rapidly raising the value of extractable current Iinv enables the extraction of a large power from fuel cell module 2 suited to fuel supply current value If, so that the amount of grid power WI used can be suppressed.

Note that in the present embodiment the extractable current value Iinv is raised at a 200 [mA/sec] large current rise rate of change, which is the second current rise rate of change, and at a 20 [mA/sec] normal current rise rate of change, which is the first current rise rate of change. If the current rise rate of change is the first current rise rate of change only, extractable current value Iinv rises gradually from time t2, as shown by the double dot and dash line in FIG. 12. Therefore if the current rise rate of change is not raised rapidly, then even if the fuel supply amounts are the same, actual extracted current Ic is reduced by only the amount of the diagonally shaded region in FIG. 12, and fuel is wastefully expended. Conversely, the problem of slow temperature change, which is a major issue for solid oxide fuel cells resulting from the use of power demand prediction control in this technology, is solved, and load following characteristics can be rapidly raised.

Note that in this embodiment the fuel supply current value If is maintained as is, but if there is too great a deviation between fuel supply current value If and extractable current value Iinv, the large over-increase in the amount of extra fuel will be wasteful even considering the re-restoration of total power demand, so it can said that an even more preferable response is to maintain the fuel supply current value while keeping the deviation amount from becoming too large.

At time t3 in FIG. 12, when the difference between fuel supply current value If and actual extracted current Ic is reduced, control section 110 changes the current rise rate of change to 20 [mA/sec], which is the first current rise rate of change, making the rise in extractable current value Iinv gradual (step S23 in FIG. 11). This is to prevent the occurrence of fuel depletion caused by the operational offset with inverter control section 111, which controls inverter 54 independently of control section 110 when extractable current value Iinv is suddenly raised in a state in which there is little margin in the fuel supply amount (the fuel supply current value If).

Next, when the value of extractable current Iinv has risen and the fuel supply current value If is approached at time t4 in FIG. 12, the value of fuel supply current value If is also raised together with extractable current value Iinv, so a certain reserve amount is secured relative to extractable current value Iinv.

Next, referring to FIG. 13, we explain another example of the operation of solid oxide fuel cell system 1 according to the present embodiment.

In the operational example shown in FIG. 12, after total power demand drops at time t1, total power demand shifts to rising during the period when the fuel supply current value If is being maintained. Relative to this, in the example shown in FIG. 13, the time after total power demand drops until this shift to rising is lengthy. Since supplied fuel is wasted when the time during which a large fuel supply current value If is maintained, fuel supply current value If is reduced after a predetermined fuel reduction standby time tw elapses.

After the sharp drop in total power demand at time t11 in FIG. 13, total power demand stays low until time t13. In the present embodiment, control section 110 is constituted so that if total power demand drops sharply and extractable current value Iinv is reduced to actual extracted current Ic, the fuel supply current value If is maintained at a fixed level thereafter during the interval of the 15 sec fuel reduction standby time tw.

In the example shown in FIG. 13, after the sharp drop in total power demand at time t11, that total power demand stays low even at time t12 when the fuel reduction standby time tw has elapsed, therefore control section 110 reduces the fuel supply current value If (the fuel supply amount) at a predetermined reduction rate of change starting at time t12. A value is selected for this reduction rate of change such that fuel cell module 2 can maintain appropriate operation. Note that in the example shown in FIG. 13, fuel supply current value If is reduced after the elapse of fuel reduction standby time tw, but if the difference between extractable current value Iinv and fuel supply current value If is less than a certain amount, fuel supply current value If is maintained without being reduced, notwithstanding the elapse of fuel reduction standby time tw. Thus minute fluctuations in fuel supply current value If can be prevented from adversely affecting the operation of fuel cell module 2.

Next, when total power demand rises at time t13 in FIG. 13, control section 110 causes extractable current value Iinv and fuel supply current value If to rise. However, the rise in extractable current value Iinv at this point does not occur immediately after the sharp reduction in extractable current value Iinv; the fuel supply current value If is also reduced, so the rate of change in the extractable current value Iinv current rise is set at the normal value, which is the first current rise rate of change of 20 [mA/sec]. I.e., at time t13 in FIG. 13, the conditions of step S20 in FIG. 11 are not met, and step S23 is executed.

Note that the present embodiment is constituted so that after reducing the fuel supply current value If for 15 seconds, maintenance of the excess fuel level is stopped, but it can be said that in cases where total power demand declines even further, the probability that total power demand will recover and rise is low, therefore rapidly reducing fuel supply current value If without waiting the 15 seconds to maintain fuel supply current value If is even more preferable.

Next, referring to FIG. 14, we explain another example of the operation of solid oxide fuel cell system 1 according to the present embodiment.

In the operational example shown in FIG. 14, after a sharp drop in total power demand, that total power demand again sharply drops, without rising. In such cases the probability that total power demand will quickly shift to rising is assumed to be low, even if fuel reduction standby time tw has elapsed after the first sharp drop, therefore control section 110 reduces fuel supply current value If.

In the example shown in FIG. 14, after a sharp drop in total power demand at time t21, at time t22 before the elapse of the 15 sec fuel reduction standby time tw, total power demand again drops sharply. Thus if the difference between fuel supply current value If and extractable current value Iinv expands, control section 110 reduces the fuel supply current value If (the fuel supply amount) at a predetermined reduction rate of change starting at time t22, even if fuel reduction standby time tw has not yet elapsed since the first sharp reduction in total power demand. Next, when total power demand rises at time t23 in FIG. 14, extractable current value Iinv and fuel supply current value If are increased.

Using the solid oxide fuel cell system 1 according to the embodiment of the present invention, a fuel cell module 2 for which high speed control is unnecessary, and a inverter 54 for which high speed control is necessary, can be efficiently and simply controlled.

I.e., in general inverter 54 requires high response control in order to be able to extract the required current from fuel cell module 2 in response to suddenly changing power demand. On the other hand if the amount of fuel supplied to fuel cell module 2 is suddenly changed, electrical generation by the fuel cell module 2 can become unstable, or sufficient electrical generation may not be achievable until the temperature recovers, therefore highly responsive control cannot be implemented. By thus performing controls of differing responsiveness using a single controller, the control algorithm is made more complex, but using the solid oxide fuel cell system 1 of the embodiment, control section 110 and inverter control section 111 are independent, and respectively control fuel flow regulator unit 38 and inverter 54, so control is not made complex. In addition, inverter control section 111 is capable of controlling inverter 54 independently of control section 110 based on power demand detected by second power demand detection circuit 111a, and on extractable current value Iinv input from control section 110. Therefore changes in fuel cell module 2 specifications and the like can be handled by changing only the control by control section 110, and changes in inverter 54 specifications can be handled by changing only the control by inverter control section 111. Thus the general purpose applicability of control section 110 and inverter control section 111 can be improved.

In the embodiment, current is extracted from fuel cell module 2 in a range not exceeding extractable current value Iinv. Since fuel is supplied to fuel cell module 2 in response to extractable current value Iinv, fuel is wastefully supplied when the actual extracted current value Ic actually extracted from fuel cell module 2 is much smaller than the extractable current value Iinv. In the embodiment, extractable current value Iinv is reduced based on the difference between extractable current value Iinv and actual extracted current value Ic (steps S1, S3 and steps S13 and S14 in FIG. 10), therefore by permitting some degree of difference between actual extracted current value Ic and extractable current value Iinv (the 400 mA at step S13 in FIG. 10) while suppressing wasteful supply of fuel, electrical generation by fuel cell module 2 can be promptly matched to an increase in actual extracted current value Ic.

In addition, in the embodiment, control of control section 110 and inverter control section 111 is exercised independently, and inverter control section 111 can freely extract current from fuel cell module 2 within a range not exceeding the extractable current value. Therefore if even a slight offset arises between the control by control section 110 and the control by inverter control section 111, there is a risk that excess actual extracted current value Ic will be extracted from fuel cell module 2 relative to the fuel being supplied to fuel cell module 2. In the embodiment, fuel flow regulator unit 38 is controlled so that the fuel supply current value If is reduced at a delay relative to a drop in extractable current value Iinv (times t11-t13 in FIG. 13; times t21-t22 in FIG. 14), therefore even if an offset occurs in the controls by control section 110 and inverter control section 111, damage to fuel cell module 2 by extraction of an excessive actual extracted current value Ic can be prevented.

Also, according to the embodiment extractable current value Iinv is suddenly reduced down to the actual extracted current value Ic detected by first power demand detection circuit 110a in response to predetermined condition, so that when total power demand again increases, the actual extracted current value Ic extracted from fuel cell module 2 follows extractable current value Iinv (times t2-t4 in FIG. 12; time t13-forward in FIG. 13; time t23-forward in FIG. 14) and is dominated by control section 110, notwithstanding the fact that inverter 54 is controlled independently of control section 110. In addition, when extractable current value Iinv is suddenly reduced, the fuel supply amount reduced at a delay goes into an excess state (times t1-t2 in FIG. 12), but when there is a rise in power demand immediately after a sudden drop (time t2 in FIG. 12), the extractable current value is raised at a large rate of change (times t2-t3 in FIG. 12), actual extracted current value Ic can be rapidly increased without imposing unreasonable demands on fuel cell module 2.

The invention claimed is:

1. A solid oxide fuel cell system for generating electrical power variable in response to power demand, comprising:
   a fuel cell module configured to generate electricity by reaction of supplied fuel;

a fuel supply device configured to supply the fuel to the fuel cell module;

an inverter operable to extract electrical current from the fuel cell module and output the current in alternating form;

a fuel cell controller circuit comprising a first power demand detection circuit configured to detect power demand, the fuel cell controller circuit being programmed to:

from the power demand detected by the first power demand detection circuit, generate a target fuel supply signal, indicative of a target amount of fuel supply, which operates the fuel supply device to supply the target amount of fuel to the fuel cell module so that the fuel cell module generates electricity sufficient to follow transitions of the power demand; and from the power demand detected by the first power demand detection circuit, generate an extractable current value signal, indicative of a maximum current value extractable from the fuel cell module; and an inverter controller circuit provided separately from the fuel cell controller circuit and including a second power demand detection circuit configured to detect the power demand independently from the first power demand detection circuit, wherein the inverter controller circuit is programmed to operate the inverter in response to the extractable current value signal from the fuel cell controller circuit and the power demand detected by the second power demand detection circuit to (i) remain under control of the extractable current value signal so as to not extract current from the fuel cell module more than the maximum extractable current value and (ii) upon a decrease of the power demand detected by the second power demand detection circuit, move out of the control of the extractable current value signal to reduce extraction of the current from the fuel cell module independently from the extractable current value signal.

2. The solid oxide fuel cell system according to claim 1, wherein the fuel cell controller circuit further comprises an extracted current detection circuit configured to detect the extracted current from the fuel cell module, and the fuel cell controller circuit is programmed to change the extractable current value signal so that the maximum extractable current value drops to the detected extracted current when the detected extracted current drops from the maximum extractable current value by more than a first predetermined current value.

3. The solid oxide fuel cell system according to claim 2, wherein the fuel cell controller circuit is programmed to change the target fuel supply signal to reduce the target amount of fuel supply some delay time after it changes the extractable current value signal to decrease the maximum extractable current value.

4. The solid oxide fuel cell system according to claim 3, wherein the fuel cell controller circuit is programmed to change the extractable current value signal to raise the maximum extractable current value at a first rate when a current equivalent to the target amount of fuel supply is greater than the detected extracted current by a threshold value or less and raise the maximum extractable current value at a second rate higher than the first rate when the current equivalent to the target amount of fuel supply is greater than the detected extracted current by more than the threshold value.

5. The solid oxide fuel cell system according to claim 1, wherein the inverter controller circuit operates at a clock speed faster than a clock speed at which the fuel cell controller circuit operates.

6. The solid oxide fuel cell system according to claim 2, wherein the fuel cell controller circuit is programmed to change the extractable current value signal so that the maximum extractable current value decreases progressively while a difference between the detected extracted current and the maximum extractable current value is less than or equal to the predetermined current value.

7. The solid oxide fuel cell system according to claim 2, wherein the fuel cell controller circuit is programmed to decreases the maximum extractable current value when one of a first set of operation conditions is satisfied, the first set of operation conditions including at least one of (i) degradation of the fuel cell module, (ii) power output above a rated power, (iii) high operation temperature of the fuel cell module, (iv) low operation temperature of the fuel cell or (v) low current extraction from the fuel cell module.

8. The solid oxide fuel cell system according to claim 4, wherein the fuel cell controller circuit is programmed to raise the maximum extractable current value when all of a second set of operation conditions are satisfied, the second set of operation conditions including at least one of (i) the current equivalent to the target amount of fuel supply being equal to or less than the detected extracted current by a threshold current value, (ii) an output voltage from the fuel cell module being equal to or higher than a threshold voltage value, (iii) an interconnect power being equal to or lower than a threshold interconnect power value, (iv) a fuel cell module temperature being equal to or higher than a threshold temperature value and (v) a grid power being higher than a threshold grid power value.

9. The solid oxide fuel cell system according to claim 8, wherein the fuel cell controller circuit is programmed to leave the maximum extractable current value unchanged when any of the second set of operation conditions is not satisfied.

* * * * *